United States Patent
Armstrong et al.

(10) Patent No.: US 7,835,454 B2
(45) Date of Patent: Nov. 16, 2010

(54) MULTICARRIER MODULATION SYSTEMS

(75) Inventors: Jean Armstrong, North Balwyn (AU); Simon W. Brewer, Bayswater (AU)

(73) Assignee: Analog Devices, B.V., Limerick (IE)

( * ) Notice: Subject to any disclaimer, the term of this patent is extended or adjusted under 35 U.S.C. 154(b) by 1089 days.

(21) Appl. No.: 10/951,319

(22) Filed: Sep. 27, 2004

(65) Prior Publication Data

US 2005/0243938 A1 Nov. 3, 2005

Related U.S. Application Data

(60) Provisional application No. 60/575,166, filed on May 28, 2004.

(30) Foreign Application Priority Data

| Apr. 30, 2004 | (AU) | ............................. 2004902303 |
| May 31, 2004 | (AU) | ............................. 2004902888 |
| Jul. 26, 2004 | (AU) | ............................. 2004904173 |

(51) Int. Cl.
*H04L 27/28* (2006.01)

(52) U.S. Cl. ....................... 375/260; 375/259; 375/267; 375/219; 375/316; 375/295

(58) Field of Classification Search ................. 375/260, 375/141, 146, 147, 148, 135, 136, 295, 316
See application file for complete search history.

(56) References Cited

U.S. PATENT DOCUMENTS 5,610,908 A * 3/1997 Shelswell et al. ........... 370/210

5,623,513 A 4/1997 Chow et al.

(Continued)

FOREIGN PATENT DOCUMENTS

EP 0869647 B1 10/1998

(Continued)

OTHER PUBLICATIONS

Fechtel et al. "Efficient FFT and Equalizer Implementation for OFDM Receivers," IEEE Transactions on Consumer Electronics, vol. 45, No. 4, Nov. 1999, pp. 1104-1107.

(Continued)

*Primary Examiner*—Shuwang Liu
*Assistant Examiner*—Kenneth Lam
(74) *Attorney, Agent, or Firm*—Goodwin Procter LLP

(57) ABSTRACT

The invention provides a new approach which is better suited to FFT design as applied to multicarrier modulation systems such as OFDM. The signals are scaled so that overflow, rather than being completely avoided, occurs with low probability throughout the IFFT and FFT structures. The size of the error that results from an overflow depends on how overflow is handled in the DSP. To minimize the degradation, overflow should result in saturation of the value at the maximum positive or negative value option. This is equivalent to clipping the signal. Using the new technique, signals within the FFT structure are scaled to balance the effect of clipping and round-off. Clipping may result in comparatively large errors in a few signal values but because of the spreading effect of the FFT and because OFDM systems typically include error coding/correction, system performance depends on the total error or, in other words the total noise power, across all of the FFT outputs rather than on any individual value.

41 Claims, 25 Drawing Sheets

Model used for evaluation of the receiver FFT.

U.S. PATENT DOCUMENTS

| | | | |
|---|---|---|---|
| 6,882,217 B1* | 4/2005 | Mueller | 330/2 |
| 7,154,847 B2* | 12/2006 | Lee | 370/210 |
| 7,164,723 B2* | 1/2007 | Sunwoo | 375/260 |
| 7,173,961 B2* | 2/2007 | Vadde | 375/219 |
| 7,224,742 B2* | 5/2007 | Cleveland et al. | 375/260 |
| 2003/0076904 A1* | 4/2003 | Magee | 375/340 |
| 2004/0146115 A1* | 7/2004 | Feng et al. | 375/260 |
| 2005/0160127 A1* | 7/2005 | Swartzlander et al. | 708/404 |
| 2006/0250936 A1* | 11/2006 | Chen et al. | 370/208 |
| 2007/0089015 A1* | 4/2007 | Saul | 714/746 |

FOREIGN PATENT DOCUMENTS

| | | | |
|---|---|---|---|
| JP | 60-225279 A | 11/1985 | |
| JP | 2004-336359 A | 11/2004 | |

OTHER PUBLICATIONS

Lenart et al. "A 208 Complex Point FFT Processor Using a Novel Data Scaling Approach," Proceedings of the 2003 International Symposium on Circuits and Systems, vol. 4, May 2003, pp. IV-45-IV-48.

International Search Report for PCT Application No. PCT/AU2005/000180, May 5, 2005, 3 pages.

Written Opinion for PCT Application No. PCT/AU2005/000180, May 5, 2005, 5 pages.

* cited by examiner

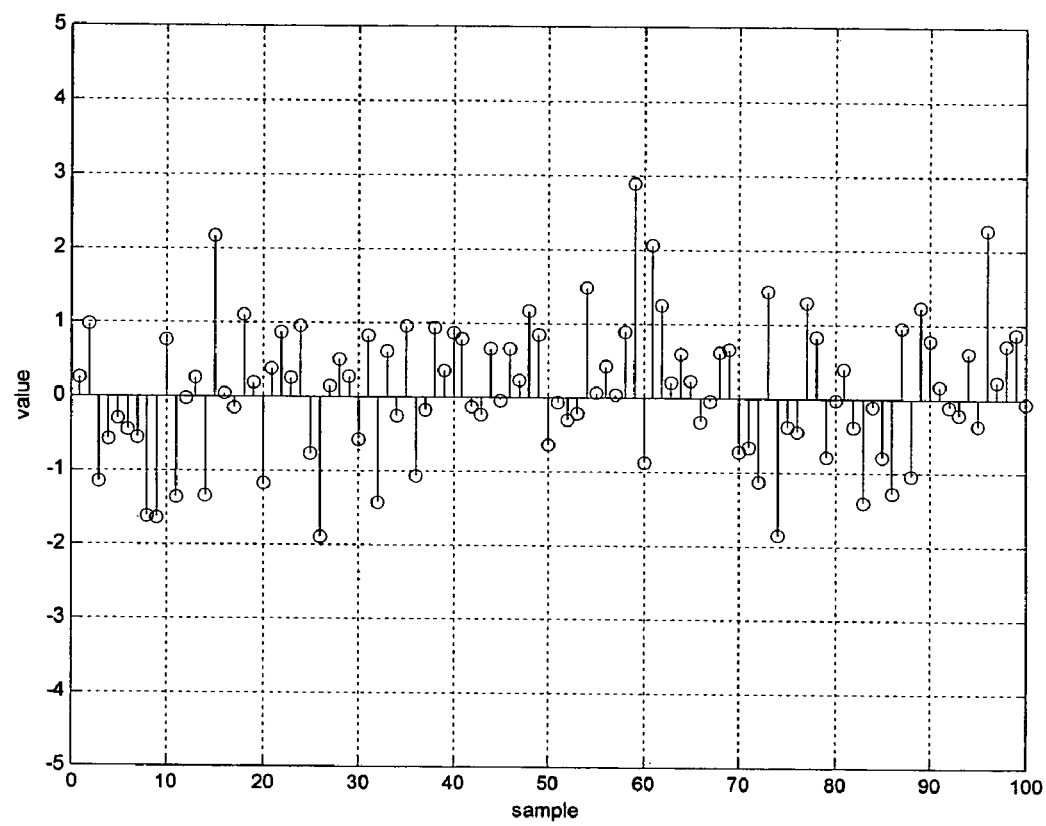
Figure 1. One hundred samples of a Gaussian variable with variance of unity

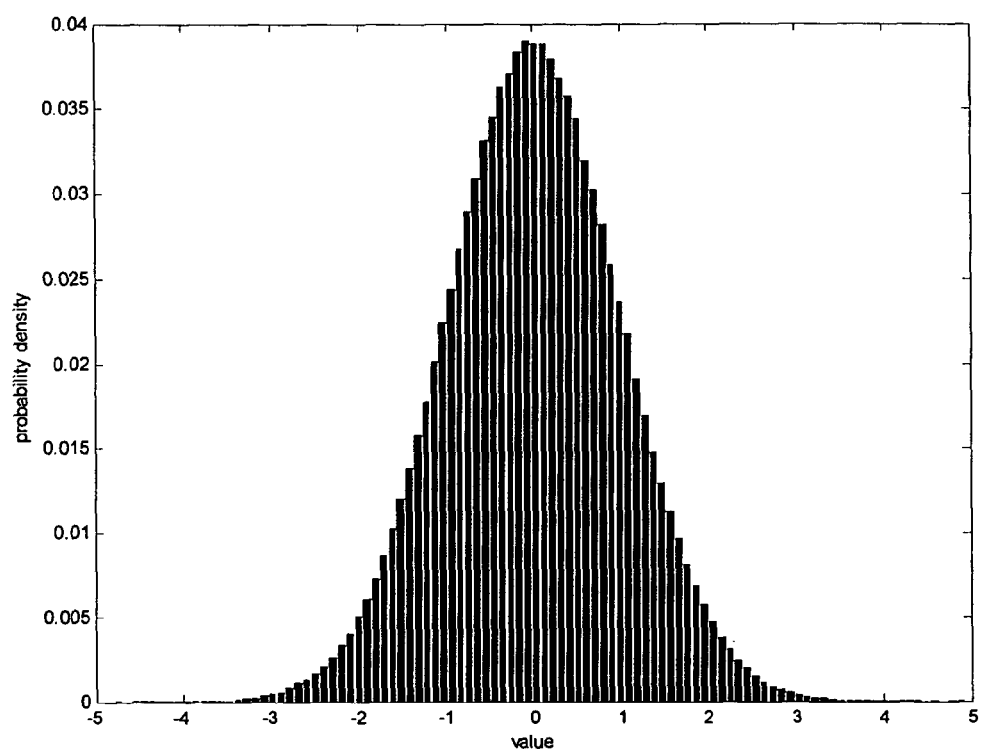
Figure 2. Probability density of 100000 samples of a Gaussian variable with variance of unity

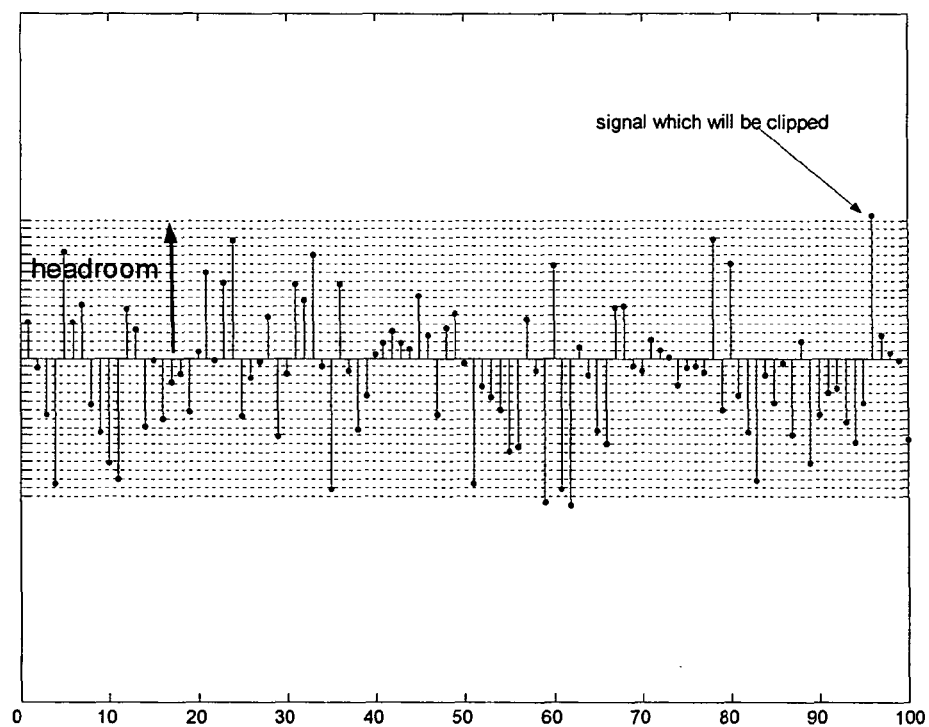
Figure 3. Gaussian random variable with standard deviation of unity and 17 quantization levels.

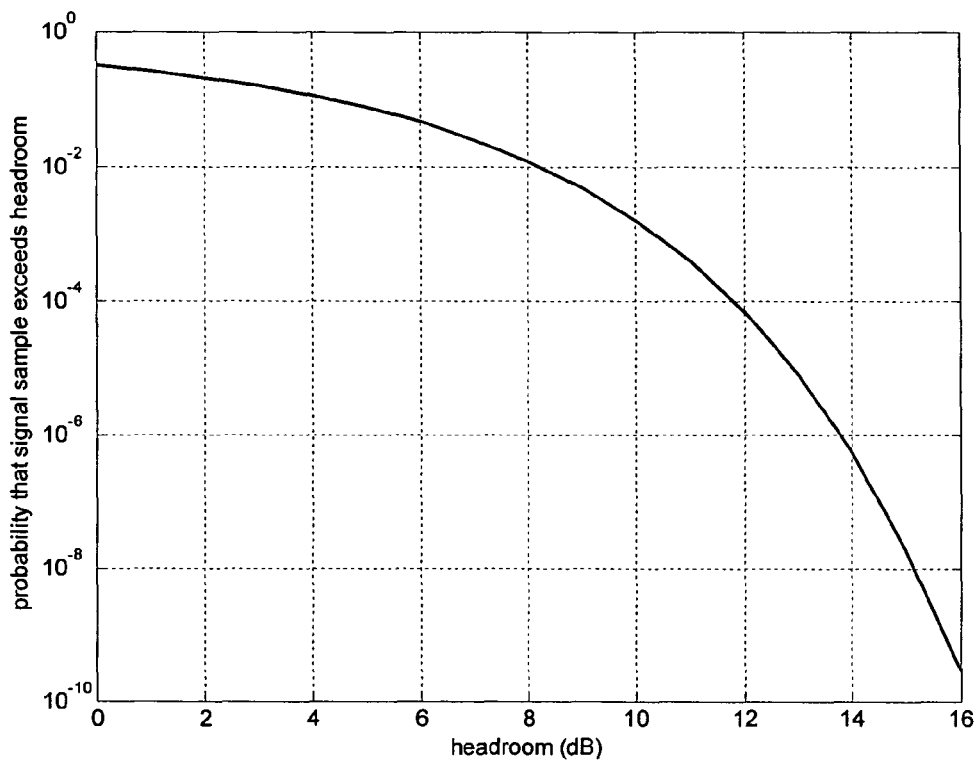
Figure 4. Probability of clipping versus headroom for Gaussian random variable.
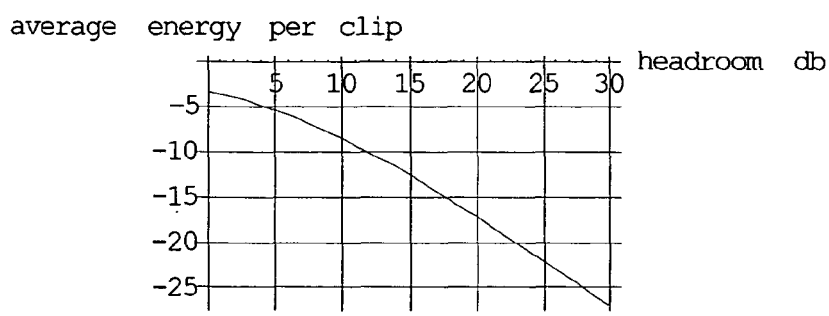
Figure 5. Average energy per clip versus headroom for signals with a Gaussian distribution.

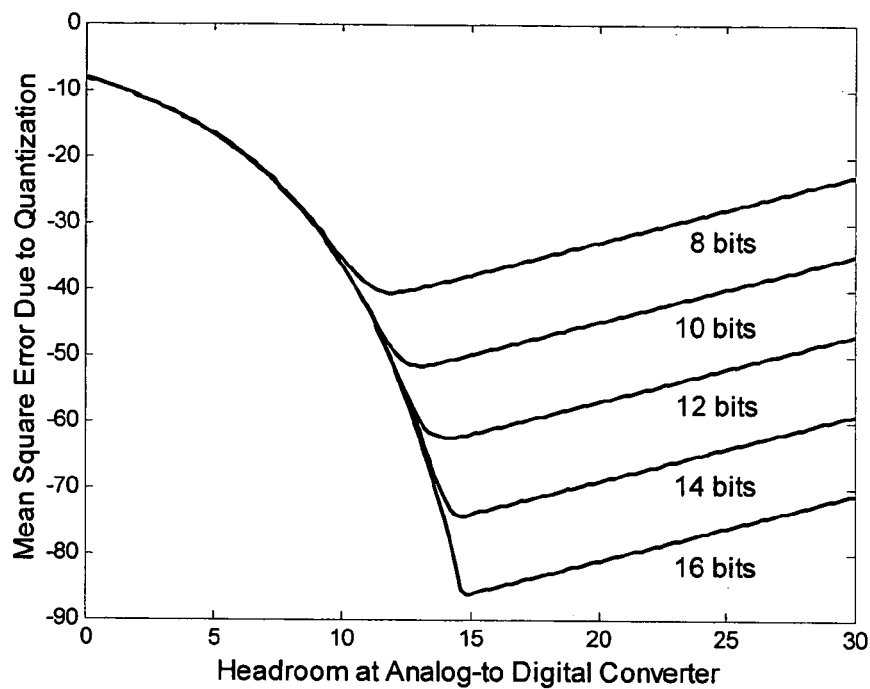
Figure 6. Error in quantizing Gaussian random variables versus headroom for varying numbers of quantization levels.

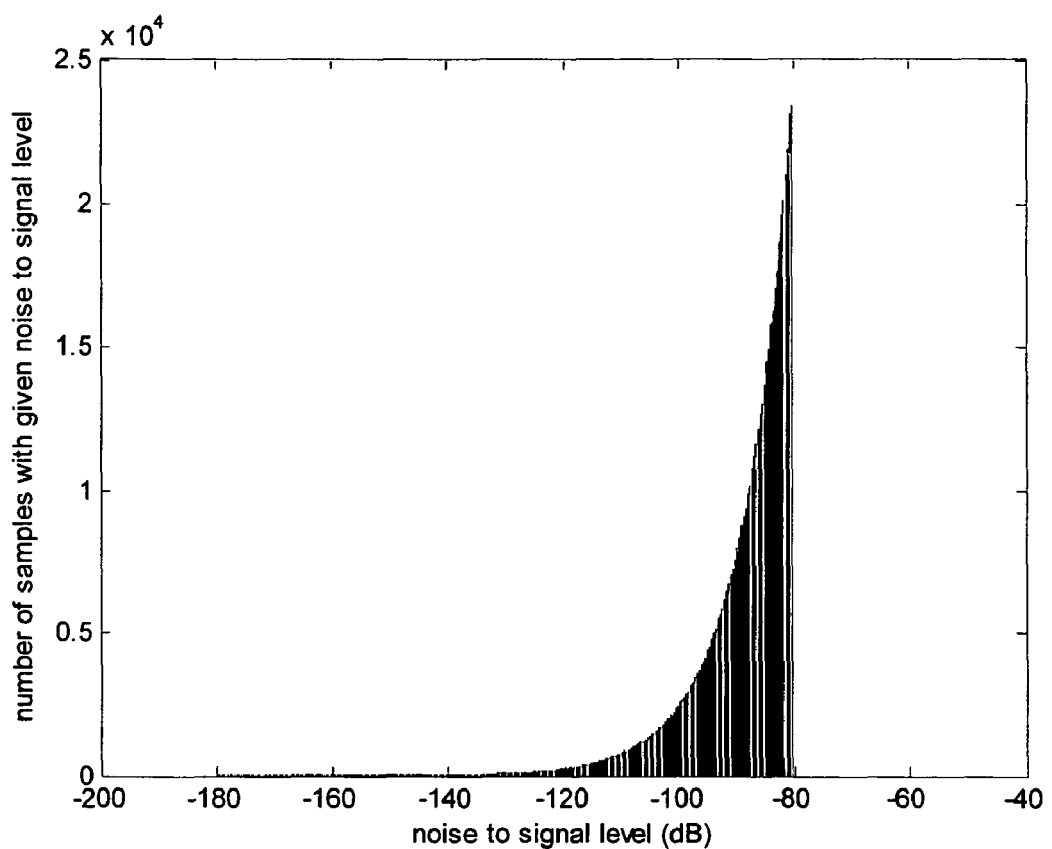
Figure 7. Histogram of error power in samples for 16 bit ADC and 16dB headroom.

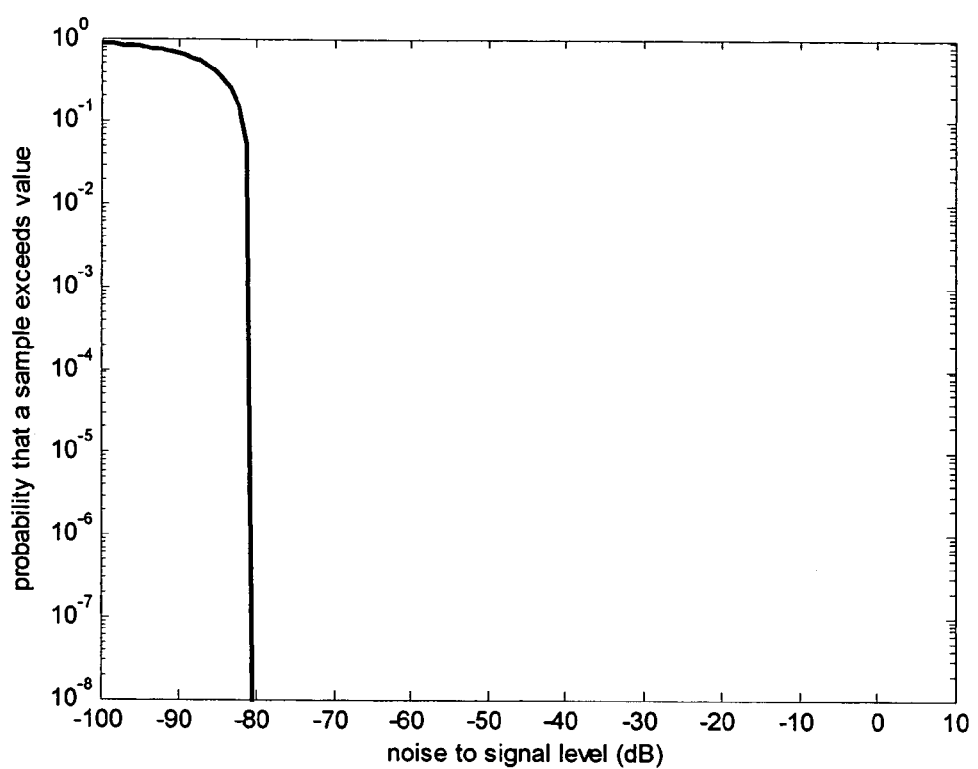
Figure 8. Complementary cumulative distribution for error power in quantizing a Gaussian signal using 16 bits and a headroom of 16 dB

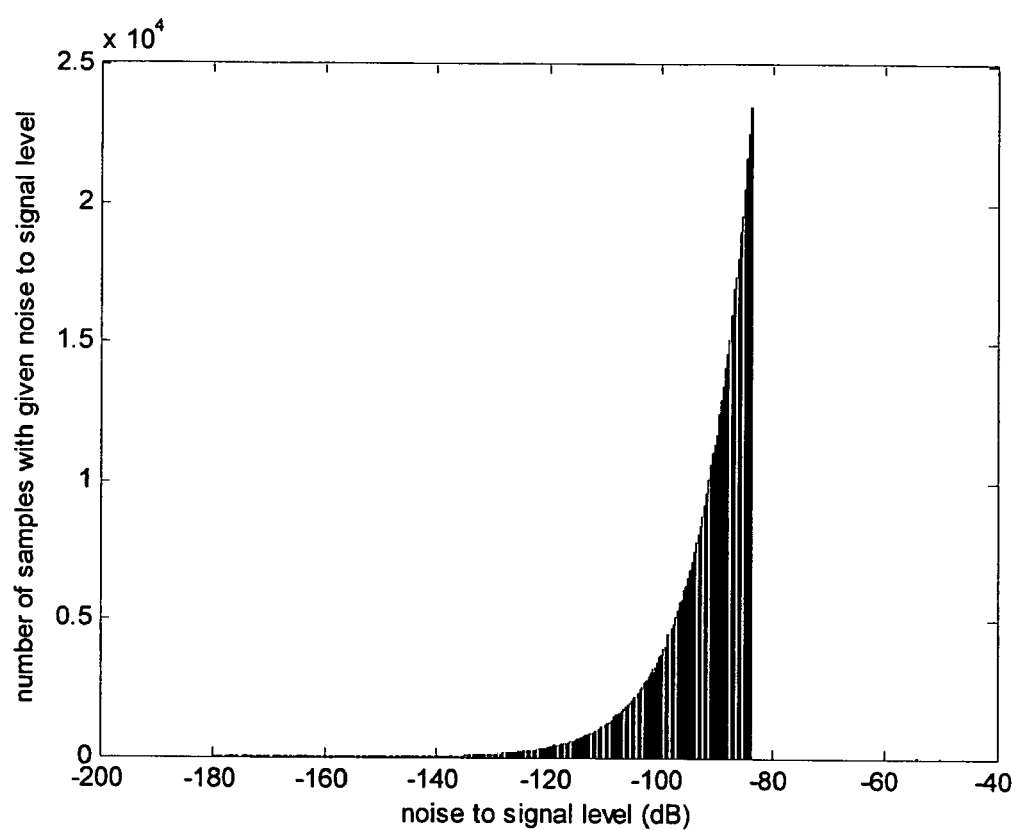
Figure 9. Histogram of error power in samples for 16 bit ADC and 12.5 dB headroom.

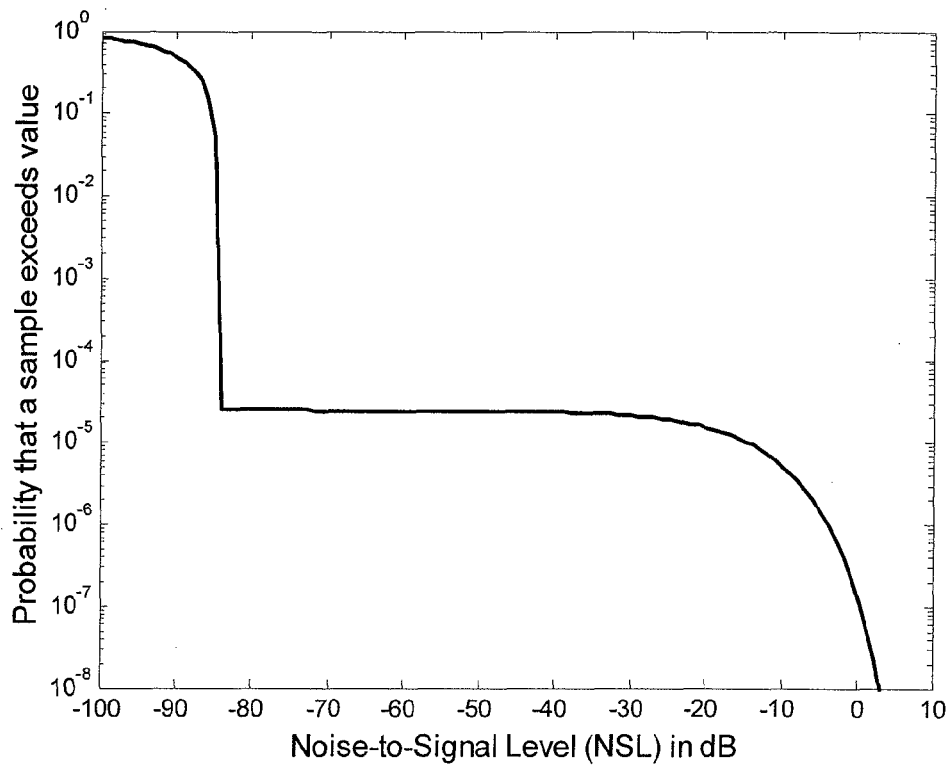
Figure 10. Complementary cumulative distribution for error power in quantizing a Gaussian signal using 16 bits and a headroom of 12.5 dB
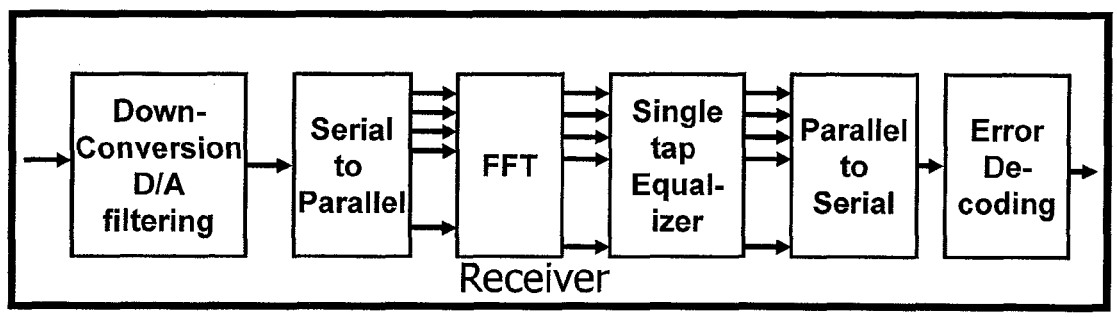
Figure 11 Block diagram of OFDM receiver
"Prior Art"

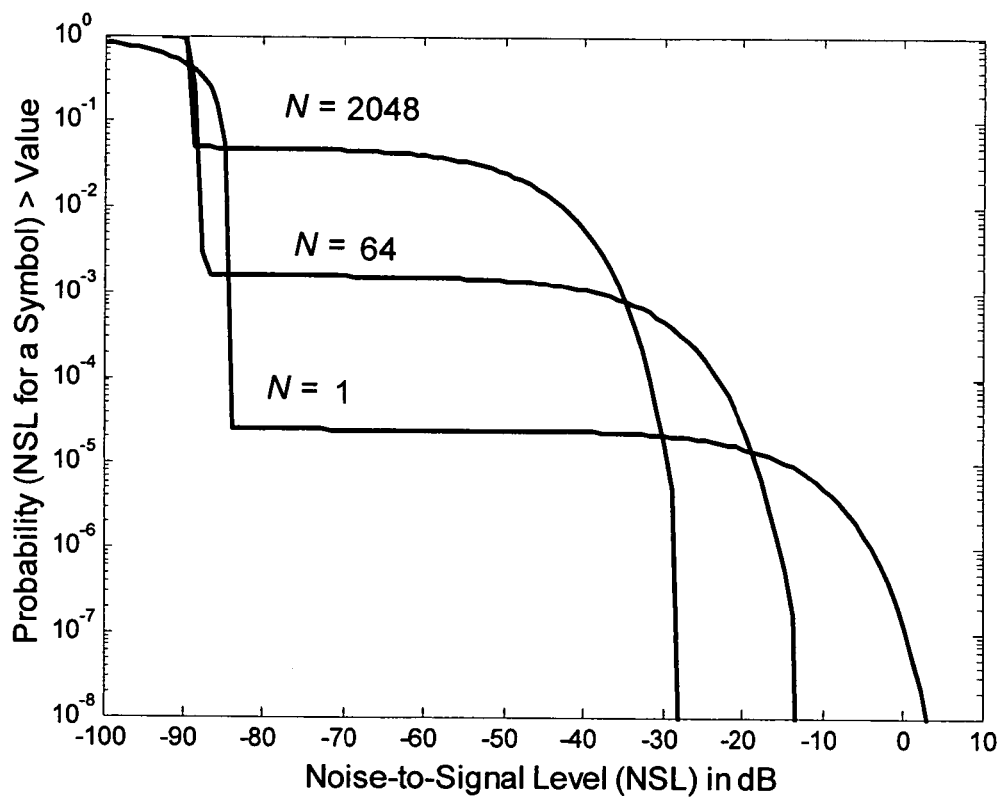
Figure 12 is a graph of complementary cumulative distribution for 16 bits and with a headroom of 12.5dB for a Gaussian distribution for an OFDM system with 64 subcarriers, and for OFDM with 2048 subcarriers.

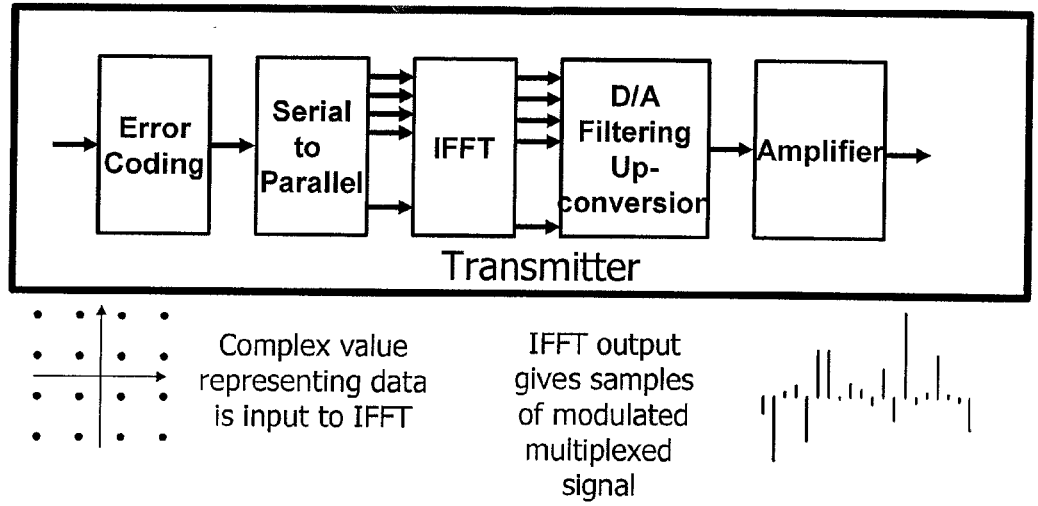
Figure 13 (a) Block diagram of OFDM transmitter
"Prior Art"
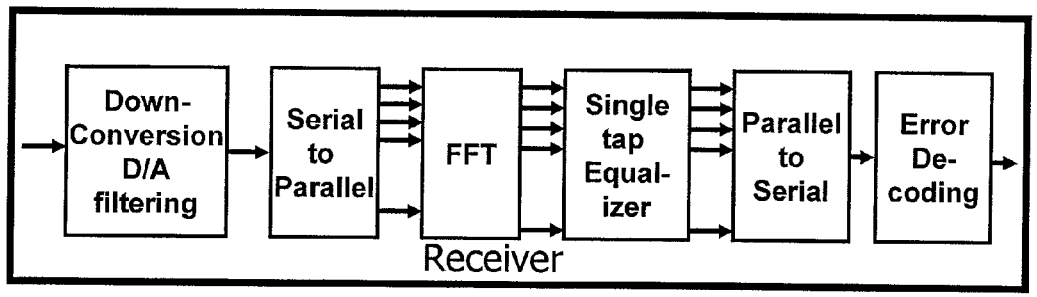
Figure 13 (b) Block diagram of OFDM receiver
"Prior Art"

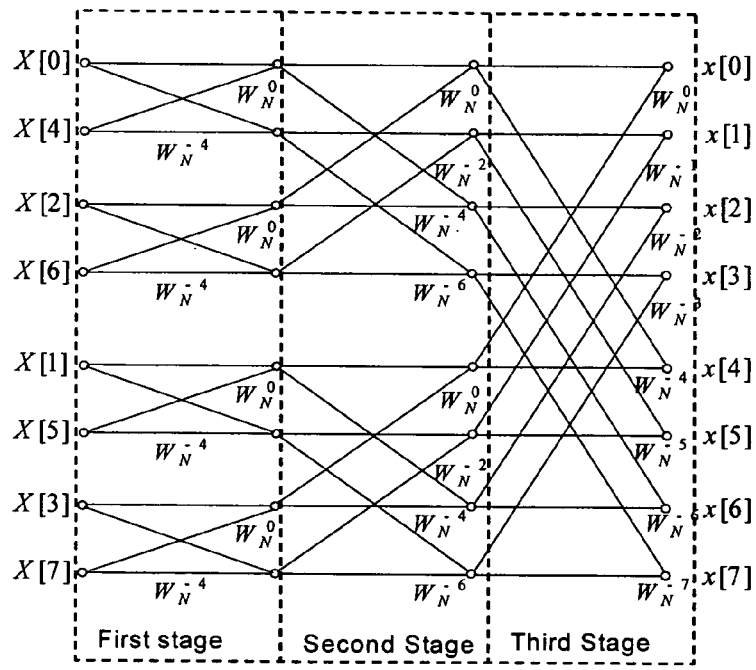
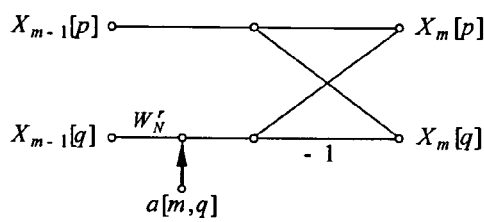
Figure 14 (a) Butterfly structure of an 8 point radix 2 FFT (b) butterfly showing noise due to rounding error
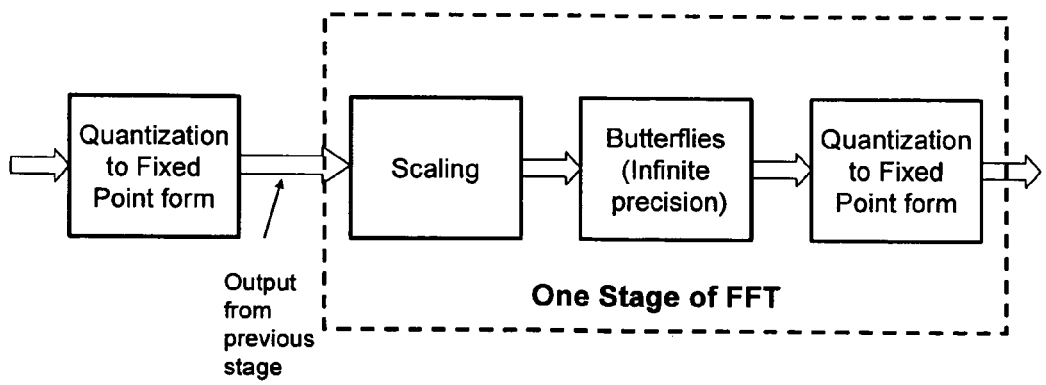
Figure 14(c). Model of each FFT stage used in the Matlab simulations.

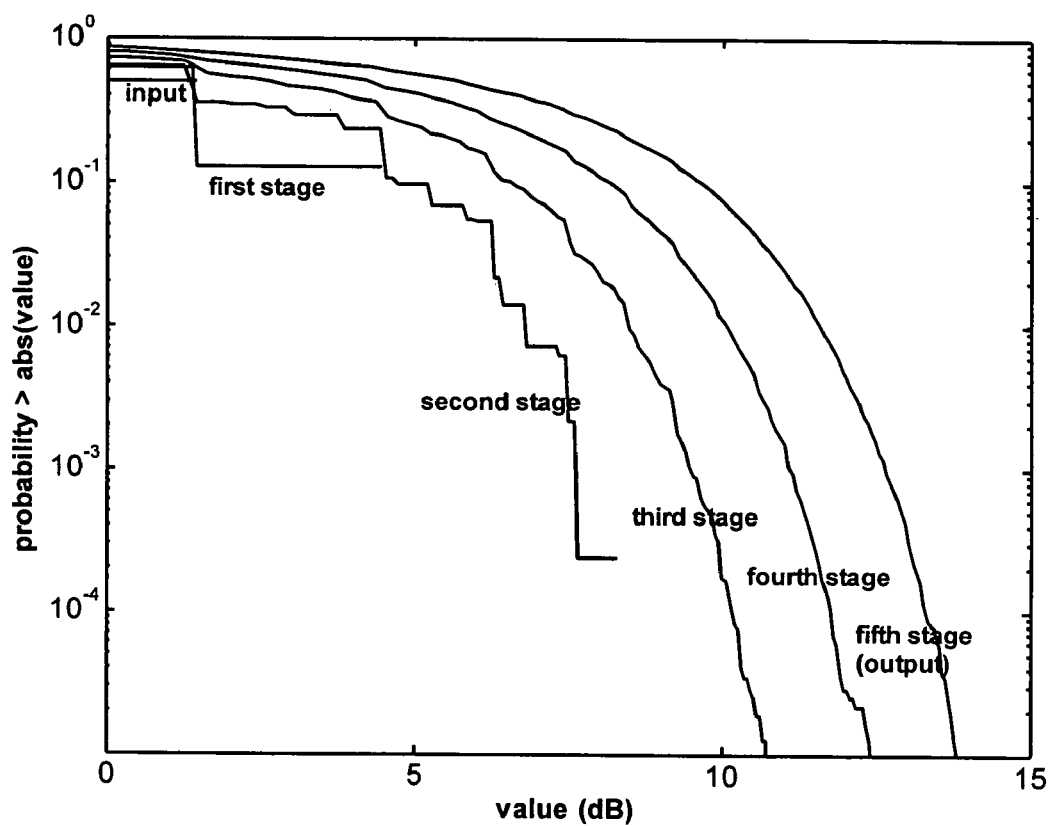
Figure 15(a) Complementary Cumulative distribution or real components of signals within IFFT structure for 4 QAM and 64 point IFFT and radix 2 transform

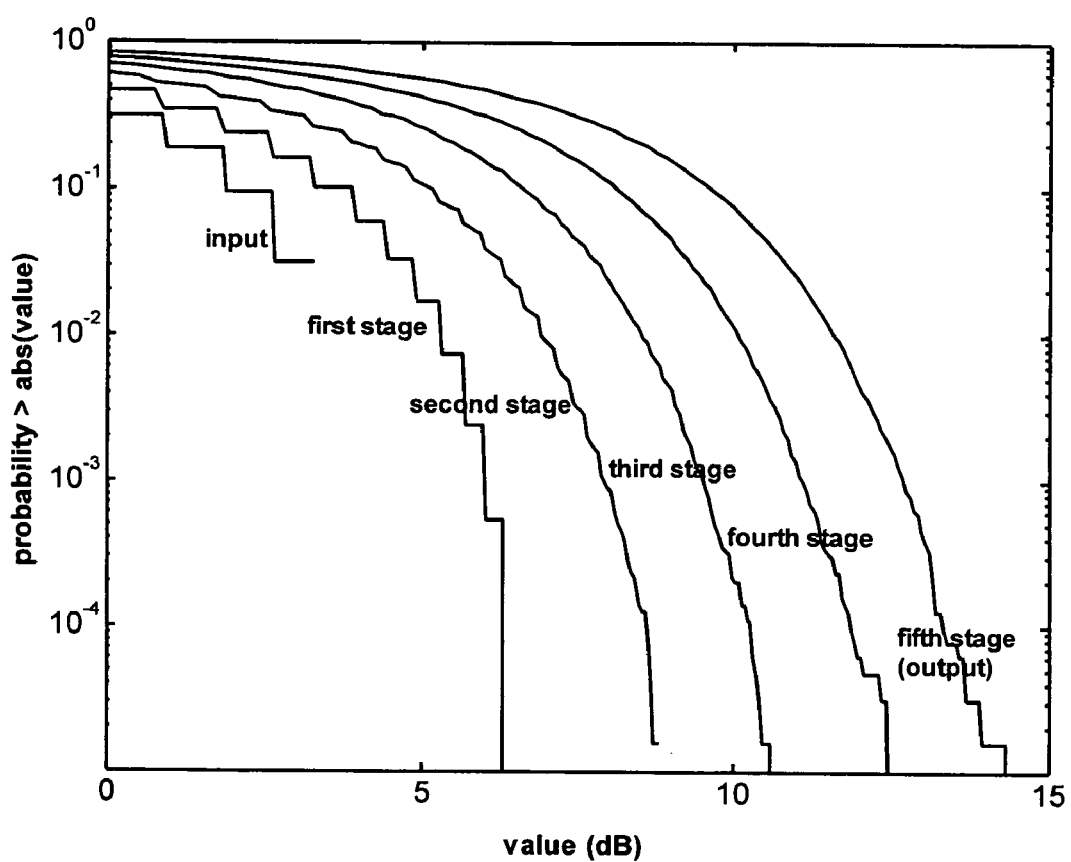
Figure 15(b) Complementary Cumulative distribution or real components of signals within IFFT structure for 64 QAM and 64 point IFFT and radix 2 transform

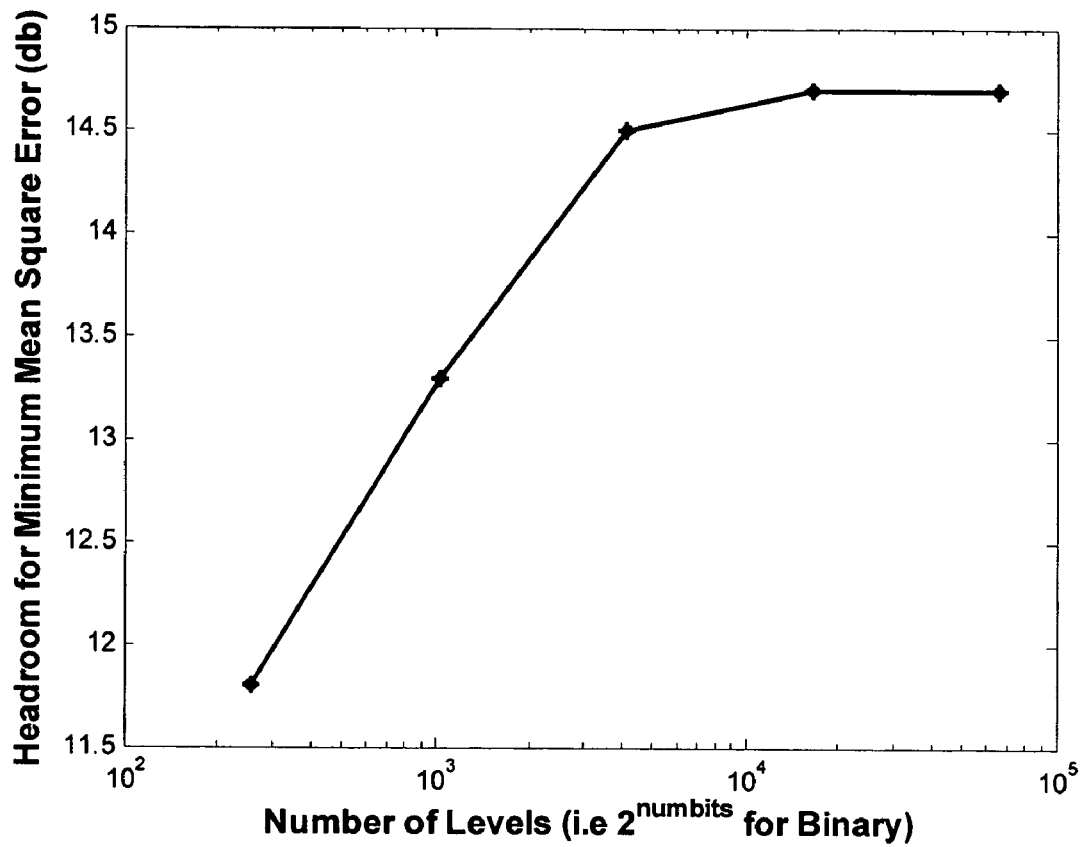
Figure 16. Headroom that gives minimum mean square error for a Gaussian signal versus the number of quantization levels

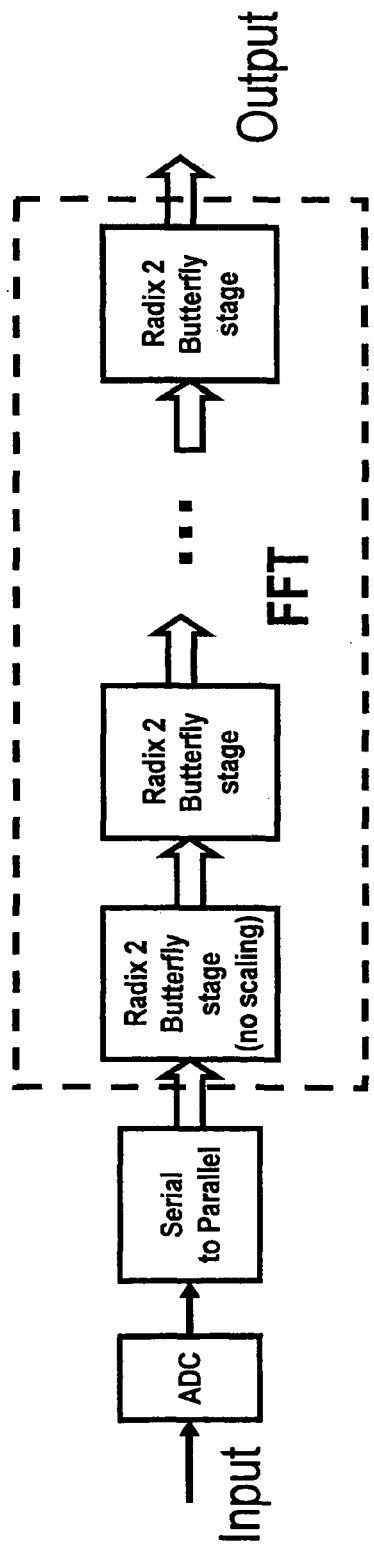
Figure 17. Model used for evaluation of the receiver FFT.
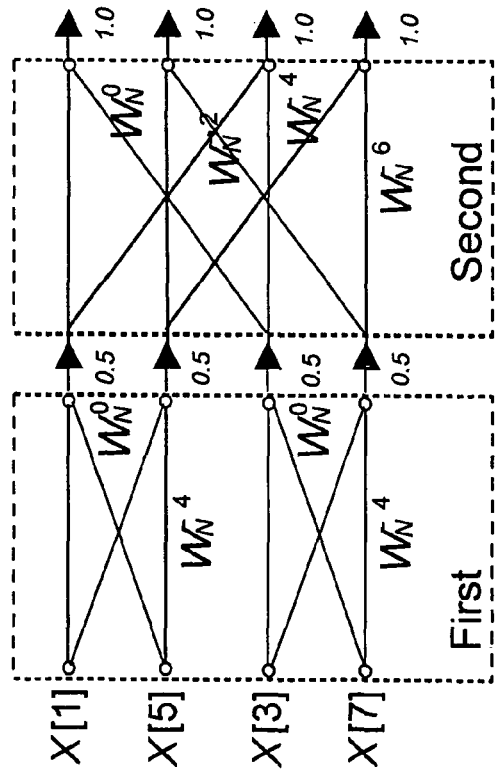
Figure 18 A butterfly structure from a radix 2 FFT with scaling factors of one embodiment of the invention as applied to a Digital Signal Processor.

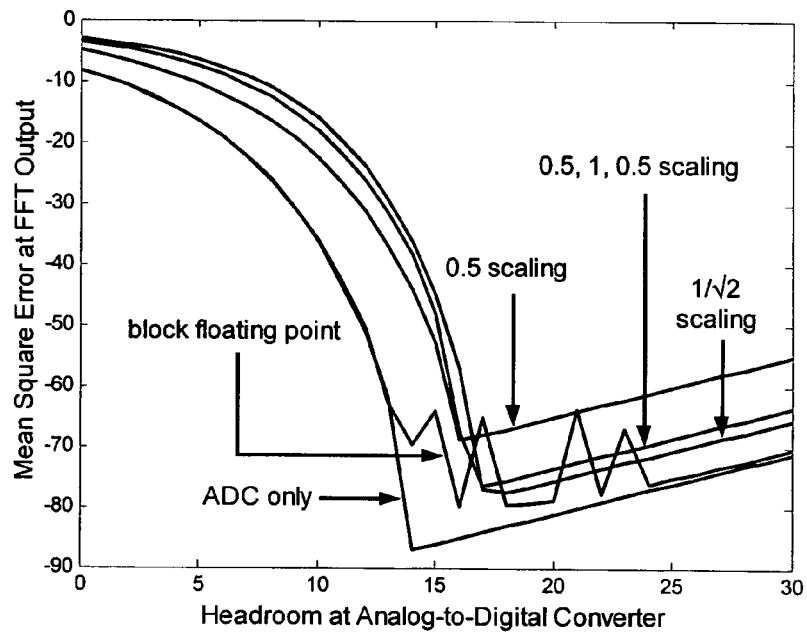
Figure 19. Normalized MSE per sample versus the headroom at the input to the ADC for varying FFT design, 16 bit precision and $N = 64$.
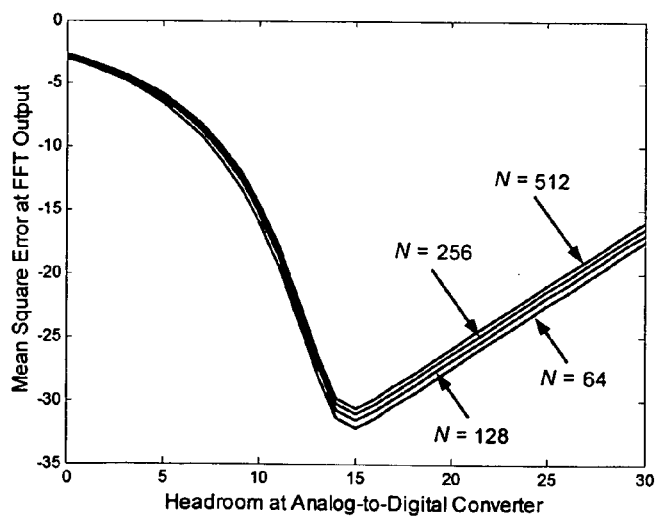
Figure 20. Normalized MSE per sample versus the headroom at the input to the ADC for $1/\sqrt{2}$ scaling, 8 bit precision and varying $N$.

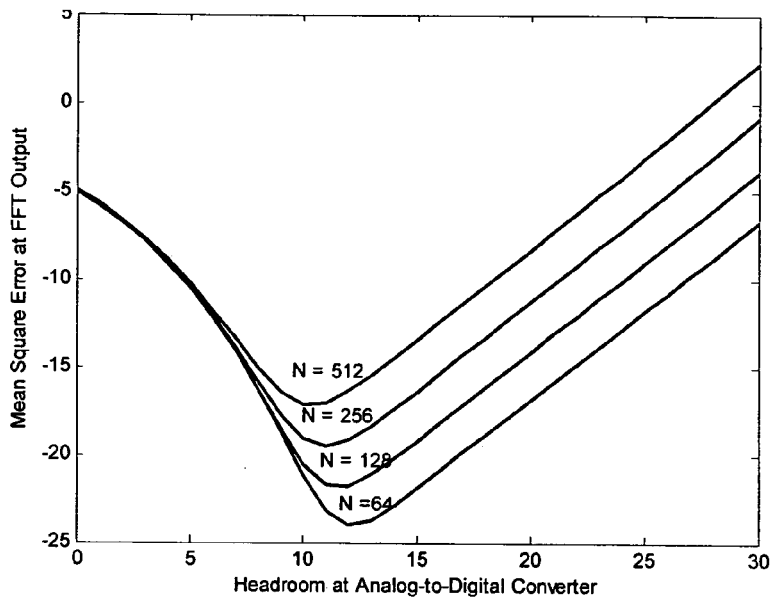
Figure 21. Normalized MSE per sample versus the headroom at the input to the ADC for 1/2 scaling, 8 bit precision and varying $N$.
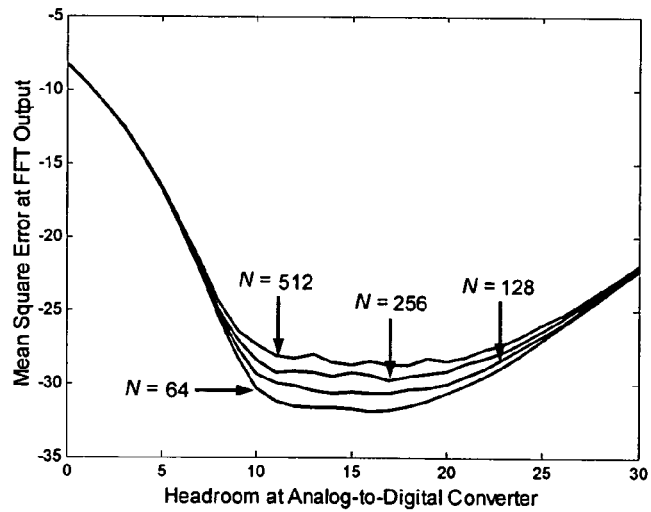
Figure 22. Normalized MSE per sample versus the headroom at the input to the ADC for block floating point, 8 bit precision and varying $N$.

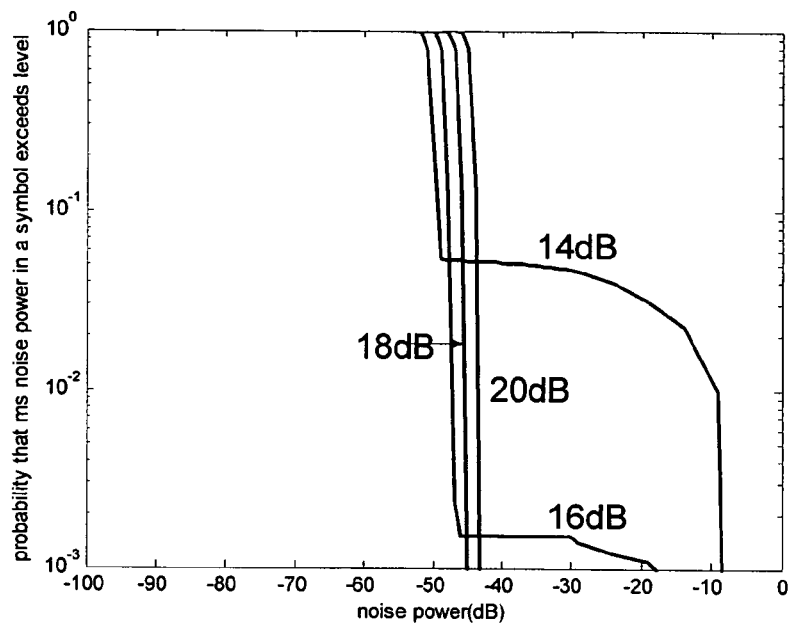
Figure 23. Complementary cumulative distribution of MSE per symbol for 0.5 weighting, 16 bit fixed-point, $N = 64$ and $h_r = 14, 16, 18$ and 20dB.
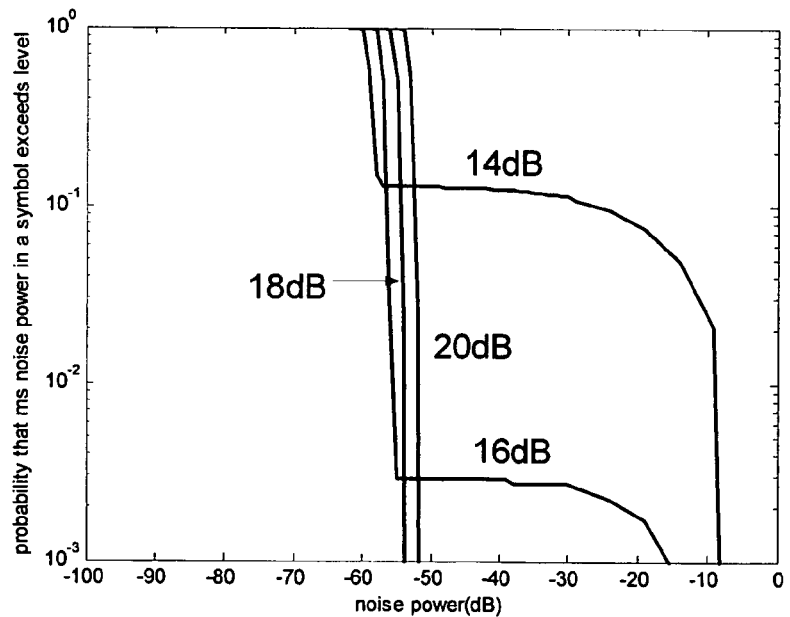
Figure 24. Complementary cumulative distribution of MSE per symbol for alternating 0.5, 1 weighting, 16 bit fixed-point, $N = 64$ and $h_r = 14, 16, 18$ and 20dB.

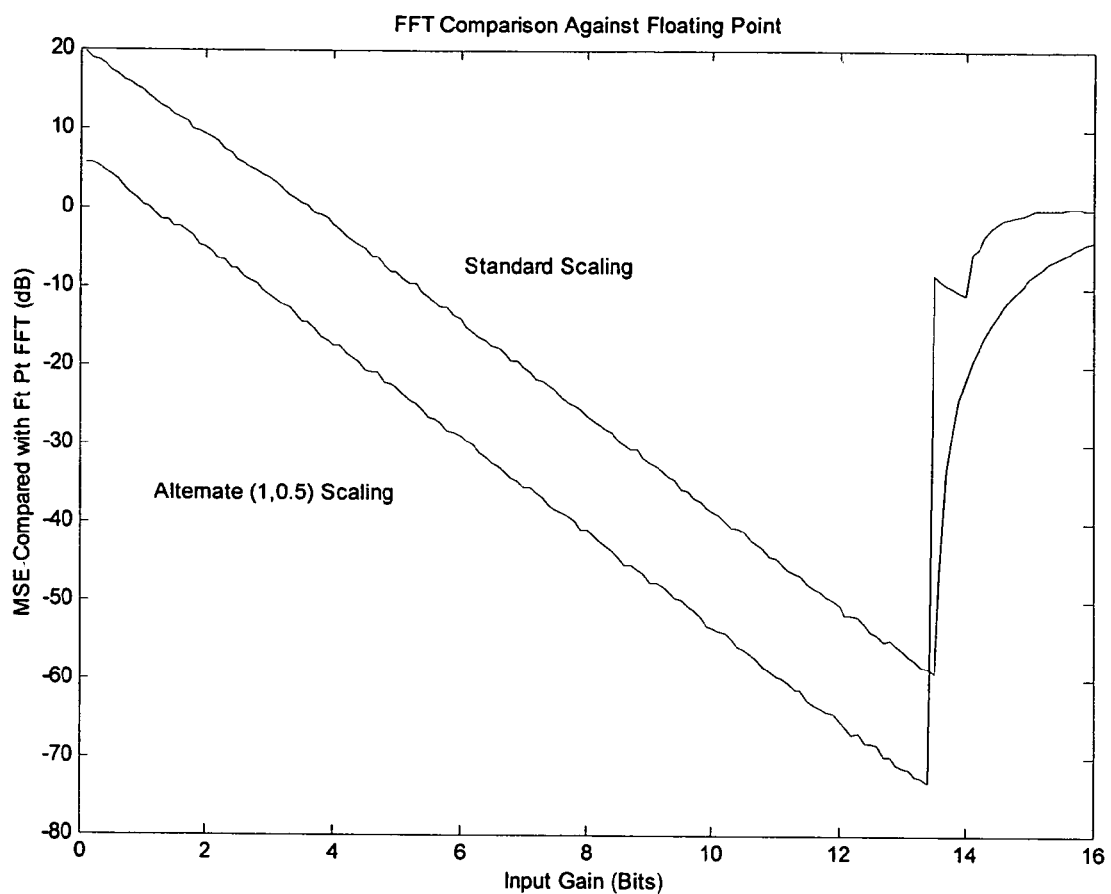
Figure 25: Comparison of two ADSP-BF533 implementations of a 256-point Radix-2 Complex Decimation in Time FFT.

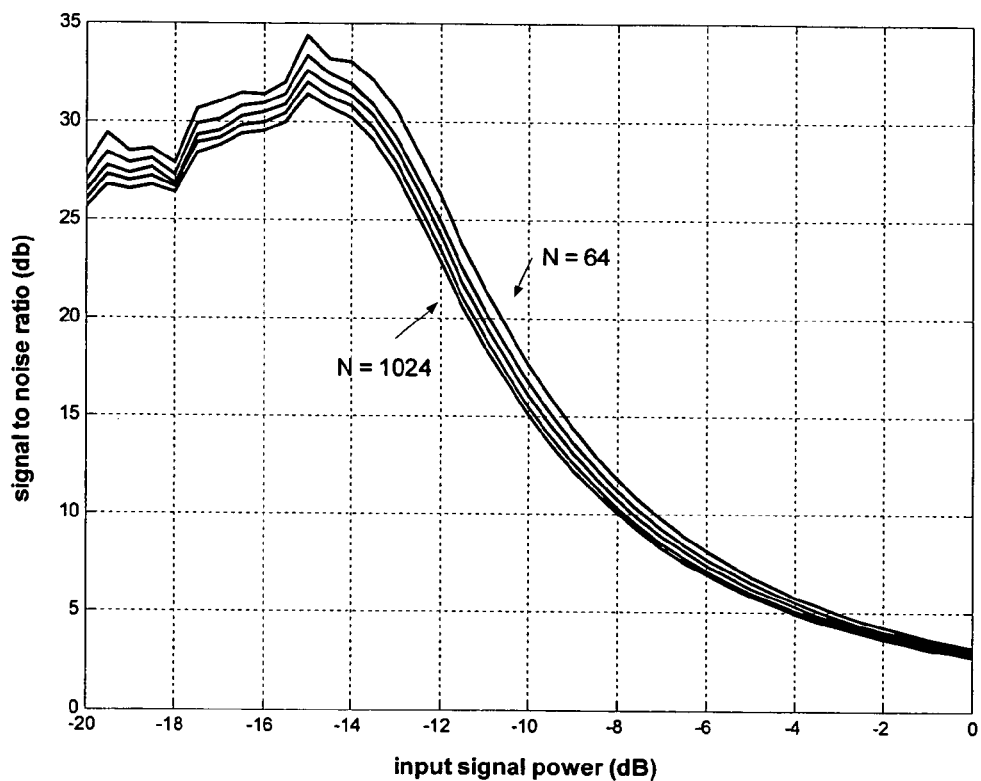
Figure 26. SNR at IFFT output as a function of input signal power for IFFT designed with fixed scaling factor of $1/\sqrt{2}$ at each stage and 8 bit fixed point precision, Results for 64,128,256, 512,1024 point IFFT and 64QAM modulation

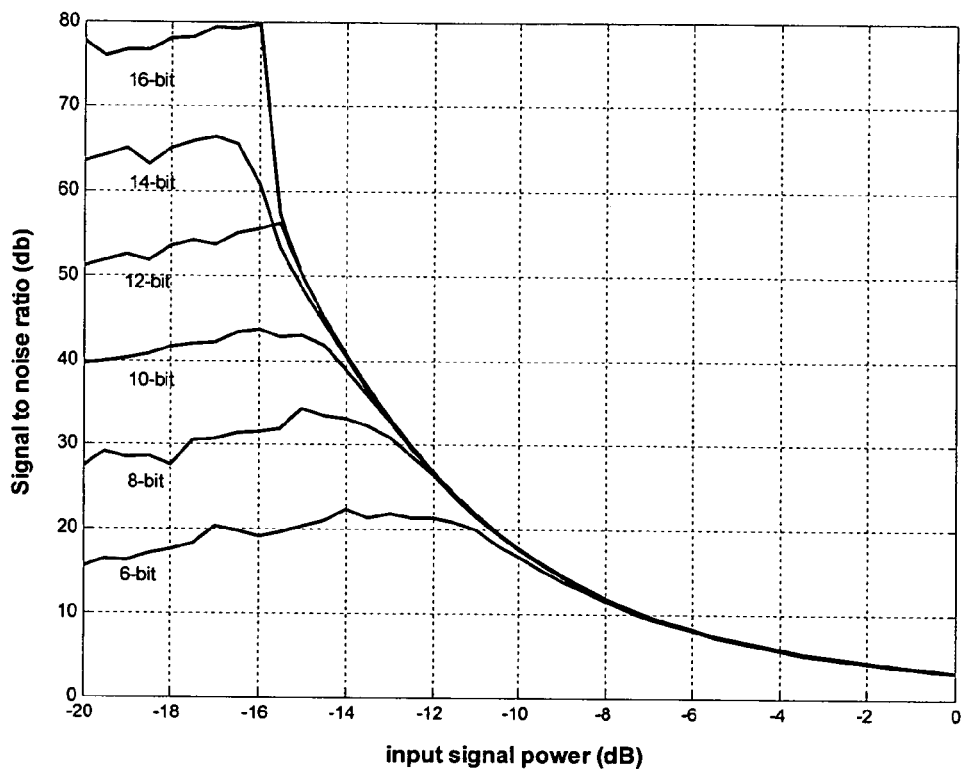
Figure 27. SNR at IFFT output as a function of input signal power for IFFT designed with fixed scaling factor of $1/\sqrt{2}$ at each stage 64 point IFFT and 64QAM modulation. Results for 6, 8, 10,12,14,16 bit fixed point precision.

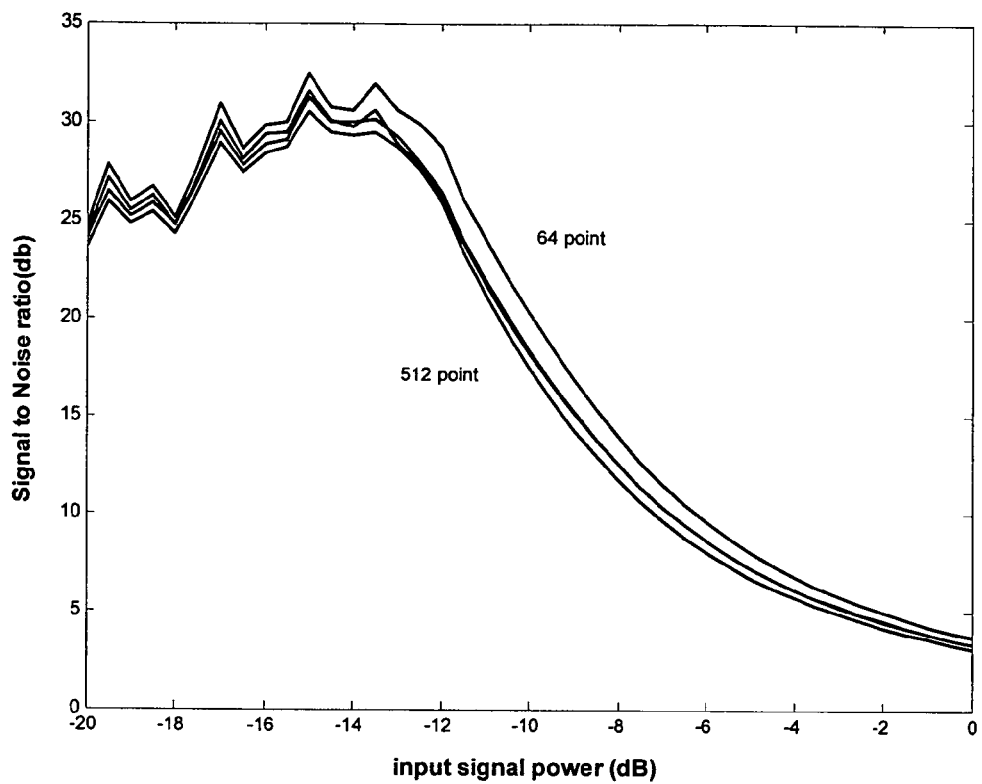
Figure 28. SNR at IFFT output as a function of input signal power for IFFT designed with fixed scaling factor of alternately 0.5 and 1 at each stage and 8 bit fixed point precision, Results for 64,128,256, 512,1024 point IFFT and 64QAM modulation

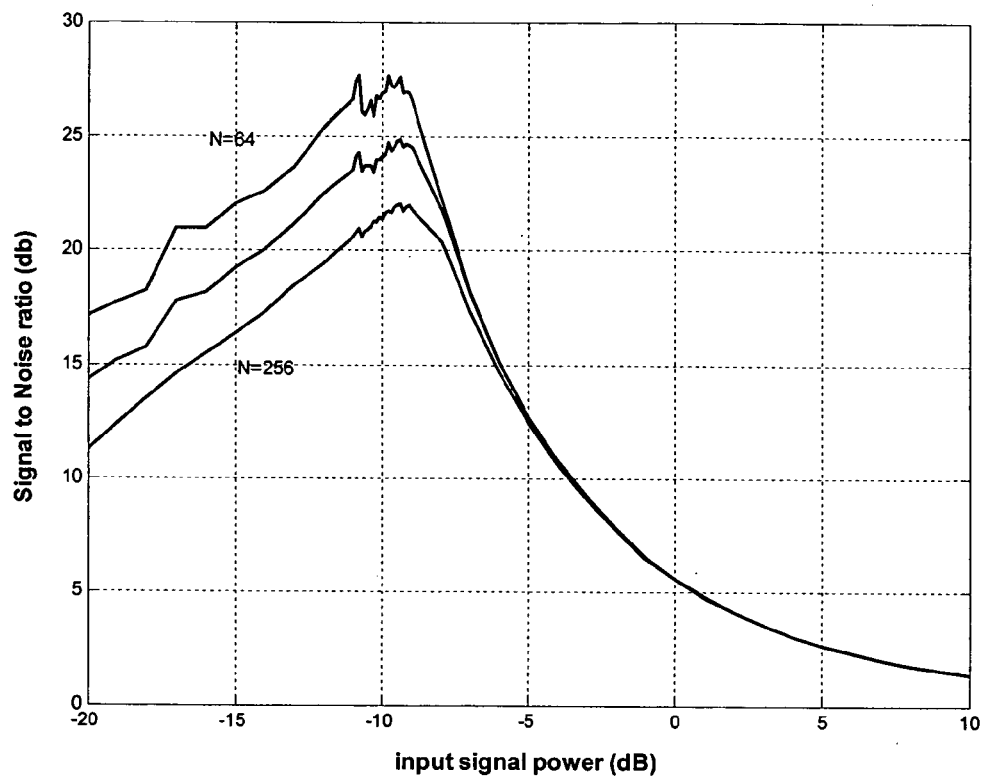
Figure 29. SNR at IFFT output as a function of input signal power for IFFT designed with fixed scaling factor of 0.5 at each stage and 8 bit fixed point precision, Results for 64,128,256 point IFFT and 64QAM modulation

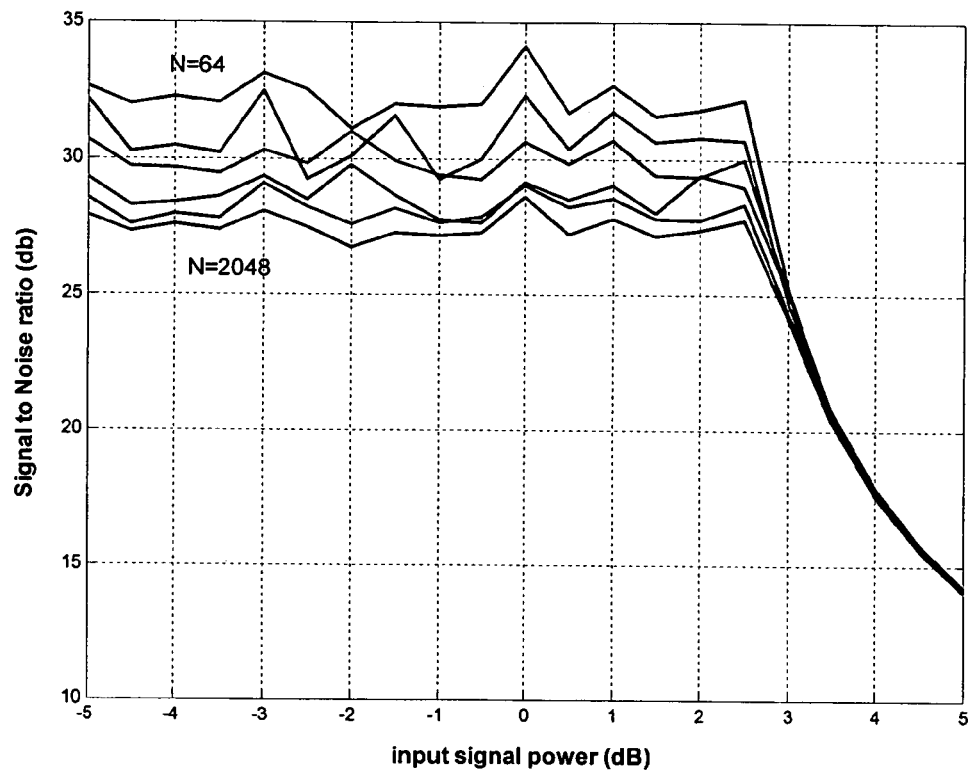
Figure 30. SNR at IFFT output as a function of input signal power for IFFT designed using block floating point at each stage and 8 bit fixed point precision, Results for 64,128,256, 512,1024,2048 point IFFT and 64QAM modulation

MULTICARRIER MODULATION SYSTEMS

CROSS REFERENCE TO RELATED APPLICATIONS

The present application is related to and claims priority from U.S. Provisional Application No. 60/575,166, filed May 28, 2004, entitled "Improvements in Multicarrier Modulation Systems," which is hereby incorporated by reference in its entirety. The present application is also related to and claims priority from Australian Provisional Application No. 2004902303, filed Apr. 30, 2004, entitled "Data Transmission and Reception in Multicarrier Modulation Systems," which is hereby incorporated by reference in its entirety. The present application is further related to and claims priority from Australian Provisional Application No. 2004902888, filed May 31, 2004, entitled "Improvements in Multicarrier Modulation Systems," which is hereby incorporated by reference in its entirety. The present application is still further related to and claims priority from Australian Provisional Application No. 2004904173, filed Jul. 26, 2004, entitled "Effect of Rounding and Saturation in Fixed-Point DSP Implementation of IFFT and FFT for OFDM Applications," which is hereby incorporated by reference in its entirety.

FIELD OF THE INVENTION

The invention is related to a method of improving multicarrier modulation systems. The invention more particularly relates to the manipulation of signals represented by numbers using a transform process. The invention relates even more particularly to data transmission and reception in multicarrier modulation systems which use orthogonal transform pairs to allow communication on multiple subcarriers but is not limited to such use.

In particular, the invention is related to a method of implementing Inverse Fast Fourier Transforms (IFFTs) and Fast Fourier Transforms (FFTs) for multicarrier communications systems including Orthogonal Frequency Division Multiplexing (OFDM) transmitters and receivers. It concerns the scaling and quantization of fixed point numbers within the structure of the FFT/IFFTs.

BACKGROUND ART

Multicarrier modulation systems operate by dividing a serial data stream into several parallel component data streams, and transmitting each of these parallel data streams on separate subcarriers. At the receiving end, each of the parallel data streams is received, and arranged into a serial data stream corresponding with the serial data stream provided to the transmitter. Accordingly, in this type of system, only a small proportion of the total data is carried on each subcarrier.

While the power spectrum of each of the parallel data streams overlaps, communication is possible as the subcarriers are generally orthogonal with each other over a symbol period. This is a direct consequence of the use of orthogonal transforms in the transmitter and receiver respectively. Using an N-point transform (and thus providing N subcarriers) effectively increases the symbol period by a factor of N.

There are various design issues which limit the practical implementation of multicarrier modulation systems.

A design issue is to account for limitations due to arithmetic processing. Orthogonal frequency division multiplexing (OFDM) is the modulation technique used in many new and emerging broadband communication systems including wireless local area networks (LANs), high definition television (HDTV) and 4G systems.

The key component in an OFDM transmitter is an inverse discrete Fourier transform (IDFT) and in the receiver, a discrete Fourier transform (DFT). Usually, the transmitter performs an inverse DFT and the receiver a forward DFT. Some form of the fast Fourier transform algorithm (FFT) is usually used to implement the transforms.

The increasing computational power and performance capabilities of DSPs make them ideal for the practical implementation of OFDM functions. Consumer products are usually sensitive to cost and power consumption and for this reason, a fixed-point DSP approach is preferred. However, fixed-point systems have limited dynamic range, causing the related problems of round-off noise and arithmetic overflow.

In the majority of OFDM applications it is important to minimize the complexity of the signal processing. Depending on the application this may be to minimize the cost, to achieve high data rates or to reduce power consumption. As the IFFT and FFT operations are significant computationally intensive operations in the transmitter and receiver it is particularly important to optimize these functions. It should be noted that throughout this document reference to the term DSP (Digital Signal Processor) has only been used as an example, it could also be replaced by any processor, microprocessor, microcontroller, microcomputer, FPGA, CPLD, PLD, ASIC, sea of gates, programmable device, discrete logic chips, discrete analog, digital or passive components, or any other implementation technique useable with OFDM application.

There is already extensive literature on the FFT. However the requirements in OFDM are significantly different from those in most FFT applications. The key difference is that in OFDM it is the error over all outputs rather than the maximum error in each output which should be minimized. This has significant influence on FFT design.

The FFT is an algorithm for calculating the DFT. A number of different algorithms exist such as the decimation in time, decimation in frequency, radix 2, radix 4 etc. However they all use a butterfly structure. For a radix 2, at each butterfly, two inputs are multiplied by two twiddle factors and the sum and difference of the products are calculated.

The numbers within the FFT can be represented in either fixed point or floating point form. Floating point representation in general gives greater accuracy but fixed point implementation is often preferred in OFDM implementations because of its lower cost and power consumption. In fixed point implementations the bits often represent a fractional part and a sign bit, thus all numbers are scaled to be in the range $\pm 1$. In the following it is assumed (without loss of generality) that this is the case as it simplifies the explanation.

There are two mechanisms which may reduce the accuracy of representation at each arithmetic operation: truncation, for example using rounding, and saturation.

Saturation occurs when the result of a calculation is outside the range $\pm 1$. This can occur only as a result of the addition operation not of the multiplication operation, because the product of two numbers within the range $\pm 1$ also lies within the range $\pm 1$. The precise effect of saturation depends on the detail of how the summation is performed. It is important that the FFT is designed so that a value greater than +1 is set to 1 and less than −1 to −1. In other words the signal is 'clipped'. Some arithmetic implementations such as 2's complement may result in 'wrap-around', so that a number greater than one is converted to a negative number and vice versa. One way to minimize or eliminate the probability of saturation is to scale the numbers so that they are well within the range $\pm 1$.

In contrast, truncation such as rounding occurs only as a result of the multiplication, not of the addition. When two b-bit numbers are multiplied, the result is 2b bits long and the least significant b bits are discarded. This contributes a small error at each butterfly. The size of this error relative to the wanted signal depends on the magnitude of the wanted signal, so to minimize the relative error the signals should be scaled to be as large as possible within the range ±1. Thus there is a conflict between minimizing the probability of saturation and minimizing the error due to truncation such as rounding.

The precise values of the signals within the FFT are unknown but the statistical properties of the signal can be calculated. The design problem is then to design the scaling so that there is the optimum trade-off between clipping and truncation such as rounding errors, given the statistical distribution of signals.

The traditional approach to FFT design is to scale the signal so that overflow is avoided. For OFDM systems using larger FFTs and fixed-point implementation, a large word length is required if rounding errors are not going to significantly degrade system performance. Scaling is usually distributed throughout the FFT structure as this reduces the overall effect of rounding errors. To completely eliminate the possibility of overflow in a radix-2 implementation, numbers must be scaled by a factor of one half after each butterfly stage. Another way to avoid overflow is to use Block Floating Point (BFP) scaling. This adapts the scaling at each stage of the FFT according to the data, so that overflow does not occur for the given input data. However a single large signal sample can result in scaling which causes large round off errors in all of the other signal values. To avoid this problem some researchers have proposed a compromise method called convergent BFP, where differing scaling factors are used for different sections of data.

It is an object of the invention to alleviate at least in part one or more of the problems of the prior art or at least provide an alternative approach. More particularly, embodiments of the invention attempt to provide a multicarrier modulation communication system which provides the option of using a lower number of bits in the DSPs for the IFFT and FFT operations of an OFDM system.

SUMMARY OF THE INVENTION

The invention provides a method of transmitting and receiving data in a multicarrier modulation system in which transform pairs allow communication using multiple subcarriers, the method including : allowing a predetermined amount of saturation of signals throughout the transmitter and receiver structures.

A method of transmitting and receiving data in a multicarrier modulation system having a transmitter and a receiver each with an input, a calculation block and an output; the calculation block of at least one of the transmitter or receiver having a plurality of interconnected calculation stages for undertaking numerical calculation on a signal received at the input and at least one scaling portion for maintaining numerical calculation substantially within an active window, and providing output derived from signal received at the input according to said numerical calculation; the method including allowing a predetermined low probability of saturation of signals beyond the active window by the scaling within the calculation block of any or both of the transmitter and receiver structures. Saturation can be allowed in a predetermined plurality of calculation stages of the calculation block.

The method is preferably for use with orthogonal frequency division multiplexing (OFDM) and can include an error detection and correction step in the receiver to substantially compensate for saturated signals.

Preferably the calculation block is based on a Digital Signal Processor (DSP).

The calculation block can be at least partially comprised of a transform structure such as a Fast Fourier Transform (FFT) and or Inverse Fast Fourier Transform (IFFT) structure and the method including allowing a predetermined amount of saturation in one or both of the FFT and the IFFT structure.

The method can include the signals being represented by complex numbers and with the calculation stages undertaking arithmetic operations of said represented complex numbers wherein the allowed saturation is limited in a predetermined manner by controlling the scaling according to statistical properties of the signal in the calculation block.

The real and imaginary components of the signals can have a Gaussian or approximately Gaussian distribution.

The real and imaginary components of the signals having a Gaussian or approximately Gaussian distribution and the headroom, being the ratio of the maximum quantization level to the standard deviation of the Gaussian signal, is selected to provide the optimal symbol distortion.

The method can have the real and imaginary components of the signals having a Gaussian or approximately Gaussian distribution and the headroom, being the ratio of the maximum quantization level to the standard deviation of the Gaussian signal, is selected to provide the optimal symbol distortion.

Furthermore, the invention correspondingly provides a transmitter and a receiver respectively including means capable of performing the inventive methods of transmitting and receiving data, as described above and can be based on a Digital Signal Processor (DSP).

Two types of error can occur due to fixed point implementation: clipping which occurs when a summation results in a number smaller or larger than the possible range and truncation such as rounding errors which occur when the least significant bits of a product are discarded.

The invention also provides a method of transmitting and receiving data in a multicarrier modulation system having a transmitter and a receiver for respectively transmitting and receiving signals, the transmitter and receiver having a plurality of inputs each for receiving an input number comprising a real or imaginary number related to a portion of a signal, a calculation block for undertaking a numerical transform of the plurality of received input numbers, and a plurality of outputs each for providing an output number comprising a real or imaginary number derived from the input numbers according to the numerical transform; the calculation block undertaking the numerical transform and comprising a plurality of interrelated calculation stages for undertaking numerical operations on numbers derived from the input numbers related to a portion of the signal, and the calculation block further comprising at least one scaling portion for undertaking scaling of one or more numbers within the calculation block to maintain the numbers substantially within the predetermined range of the active window throughout the numerical transform; the method including the scaling by the at least one scaling portion allowing a predetermined low probability of saturation of numbers within the calculation block beyond the range of the active window and clipping said saturated numbers to the extent of the active window.

The invention provides a new approach which is better suited to FFT design as applied to multicarrier modulation systems such as OFDM. The signals are scaled so that overflow, rather than being completely avoided, occurs with low probability throughout the IFFT and FFT structures. The size of the error that results from an overflow depends on how overflow is handled in the DSP. To minimize the degradation, overflow should result in saturation of the value at the maximum positive or negative value option. This is equivalent to clipping the signal. Using the new technique, signals within the FFT structure are scaled to balance the effect of clipping and round-off. Clipping may result in comparatively large errors in a few signal values but because of the spreading effect of the FFT and because OFDM systems typically include error coding/correction, system performance depends on the total error or, in other words the total noise power, across all of the FFT outputs rather than on any individual value.

In the invention clipping due to saturation is allowed, but occurs in combination with controlling the scaling according to statistical properties of the signal. The invention involves scaling the fixed point numbers throughout the FFT/IFFT structures in a way that takes into account the statistical properties of the signals and uses scaling factors which give an optimum balance for OFDM between clipping errors and truncation such as rounding errors. At many points within the FFT/IFFT the real and imaginary components of the signals have a Gaussian or approximately Gaussian distribution. At these points the numbers are scaled so that they fit within the range which has been shown to be optimum for Gaussian distributions.

The normal design process for FFT/IFFTs is to scale the numbers so that overflow can never happen. This is usually achieved either by fixed scaling or block scaling. However to avoid overflow the quantization steps must be relatively large and this results in unnecessarily large truncation such as rounding error. Although this is not stated explicitly in the literature, the implicit design criterion is that the FFT should be designed to minimize the maximum magnitude of the error in any output.

This is not the optimum FFT/IFFT implementation for OFDM. In OFDM the ultimate measure of performance is usually the bit error rate in the received signal for a given computational complexity. Because of the FFT processing in the receiver and the use of error coding, this depends in turn on the statistical properties of the errors in all of the FFT/IFFT outputs rather than the maximum value of the error in any one output.

The invention allows the minimum error rate to be achieved for a given arithmetic processing, or the arithmetic processing to be minimized for a given maximum error rate. By reducing the number of bits necessary it also allows novel structures such as where two eight bit numbers are represented within a 16 bit word length, thus reducing the number of operations required to implement the FFT/IFFT.

The invention can also be used within the extra FFT/IFFT operations used within peak to average power reduction techniques and impulse mitigation techniques which can be used in OFDM. The invention can also include use of oversized transforms to make filtering easier. It can also include the use of transforms with some inputs and or outputs zero such as in OFDMA (orthogonal frequency division multiple access) or use in OFDM systems using multiple antennas including multiple input multiple output systems

BRIEF DESCRIPTION OF THE DRAWINGS

In order that the invention is more readily understood embodiments will be described by way of illustration only with reference to the drawings wherein:

FIG. 1 is a graph of one hundred samples of a Gaussian variable with variance of unity FIG. 2 is a graph of probability density of 100000 samples of a Gaussian variable with variance of unity FIG. 3 is a graph of a Gaussian random variable with standard deviation of unity and 17 quantization levels.

FIG. 4 is a diagram of probability of clipping versus headroom for Gaussian random variable.

FIG. 5 is a graph of average energy per clip versus headroom for signals with a Gaussian distribution.

FIG. 6 is a diagram showing error in quantizing Gaussian random variables versus headroom for varying numbers of quantization levels FIG. 7 is a histogram of error power in samples for 16 bit ADC and 16 dB headroom.

FIG. 8 is a graph of complementary cumulative distribution for error power in quantizing a Gaussian signal using 16 bits and a headroom of 16 dB FIG. 9 is a histogram of error power in samples for 16 bit ADC and 12.5 dB headroom.

FIG. 10 is a graph of complementary cumulative distribution for error power in quantizing a Gaussian signal using 16 bits and a headroom of 12.5 dB FIG. 11 is a block diagram of a typical simplified OFDM receiver FIG. 12 is a graph of complementary cumulative distribution for 16 bits and with a headroom of 12.5 dB for a Gaussian distribution, for an OFDM system with 64 subcarriers, and for OFDM with 2048 subcarriers.

FIG. 13($a$) is a block diagram of a typical simplified OFDM transmitter;

FIG. 13($b$) is a block diagram of a typical simplified OFDM receiver.

FIG. 14($a$) is a butterfly structure of an 8 point radix 2 FFT;

FIG. 14($b$) butterfly showing noise due to rounding error

FIG. 14($c$) is a model of each FFT stage used in the Matlab simulations

FIG. 15($a$) is a schematic diagram of complementary cumulative distribution of real components of signals within IFFT structure for 4 QAM and 64 point IFFT and radix 2 transform FIG. 15($b$) is a schematic diagram showing a complementary cumulative distribution of real components of signals within the IFFT structure for 64 QAM and 64 point IFFT and radix 2 transform.

FIG. 16 is a plot of headroom that gives minimum mean square error for a Gaussian signal versus the number of quantization levels.

FIG. 17 is the model used for evaluation of the receiver FFT of one embodiment of the invention as applied to a Digital Signal Processor.

FIG. 18 is a butterfly structure from a radix 2 FFT with scaling factors for one embodiment of the invention as applied to a Digital Signal Processor.

FIG. 19 shows graph of normalized MSE per sample versus the headroom at the input to the ADC for varying FFT design, 16 bit precision and N=64.

FIG. 20 shows graph of normalized MSE per sample versus the headroom at the input to the ADC for $1/\sqrt{2}$ scaling, 8 bit precision and varying N.

FIG. 21 shows graph of normalized MSE per sample versus the headroom at the input to the ADC for ½ scaling, 8 bit precision and varying N FIG. 22 shows graph of normalized MSE per sample versus the headroom at the input to the ADC for block floating point, 8 bit precision and varying N.

FIG. 23 shows graph of complementary cumulative distribution of MSE per symbol for 0.5 weighting, 16 bit fixed-point, N=64 and $h_r$=14, 16, 18 and 20 dB.

FIG. 24 shows graph of complementary cumulative distribution of MSE per symbol for alternating 0.5, 1 weighting, 16 bit fixed-point, N=64 and $h_r$=14, 16, 18 and 20 dB.

FIG. 25 shows graph of comparison of two ADSP-BF533 implementations of a 256-point Radix-2 Complex Decimation in Time FFT.

FIG. 26 is a plot of Signal to Noise Ratio (SNR) at IFFT output as a function of input signal power for IFFT designed with fixed scaling factor $1/\sqrt{2}$ at each stage and 8 bit fixed point precision.

FIG. 27 is a plot of Signal to Noise Ratio (SNR) at IFFT output as a function of input signal power for IFFT designed with fixed scaling factor $1/\sqrt{2}$ at each stage and 64 point IFFT and 64 QAM modulation.

FIG. 28 is a plot of Signal to Noise Ratio (SNR) at IFFT output as a function of input signal power for IFFT designed with fixed scaling factor of alternatively 0.5 and 1 at each stage and 8 bit fixed point precision.

FIG. 29 is a plot of Signal to Noise Ratio (SNR) at IFFT output as a function of input signal power for IFFT designed with fixed scaling factor of 0.5 at each stage and 8 bit fixed point precision.

FIG. 30 is a plot of Signal to Noise Ratio (SNR) at IFFT output as a function of input signal power for IFFT designed using block floating point at each stage and 8 bit fixed point precision.

DESCRIPTION OF AN EMBODIMENT OF THE INVENTION

Embodiments of the invention are described in relation to orthogonal frequency division multiplexing (OFDM) systems, which are a particularly popular type of multicarrier system in which discrete Fourier transforms are used to perform modulation and demodulation.

In order to understand and analyze the new technique, background information is required on a number of different topics. These are:

i. Signal characteristics
ii. OFDM, and in particular the effects of noise in OFDM;
iii. FFT structures and fixed-point implementation and the effect of limited arithmetic precision;
iv. the statistics of signals within the IFFT/FFT in OFDM;
v. and the quantization of Gaussian signals.

This background is given in the following description and simulation results are presented for the new technique and compared with the results for conventional techniques. The practical implementation of the new technique on a fixed-point DSP is also presented.

The real and imaginary components of an OFDM signal have an approximately Gaussian distribution. This results in a high peak to average ratio (PAPR). The problem most commonly associated with high PAPR, is the design of transmitter output amplifiers with large dynamic range. However it also means that the quantization range of the signals at the receiver input must be carefully chosen.

In practice a limited number of bits will be used to represent signals within the digital section of the transmitter and receiver. This limitation may be set either by the precision of analog-to-digital conversion in the receiver front end, or by the number of bits used to represent numbers in a fixed point digital signal processing (DSP) implementation.

FIG. 1 shows a sample waveform of a Gaussian random variable. For this example, the random variable has a variance of unity. FIG. 2 shows the probability distribution of the values of the same signal.

Although most of the values are concentrated near zero, there is a long tail and for the example shown in FIG. 2, there are some values close to 5. Although values with high amplitude occur with low probability, there is still a small, but finite, probability that they will occur. In the context of high data rate OFDM receivers, millions of samples may be received per second, so low probability events occur at relatively short time intervals. For example, a television receiver which fails every few minutes would not be acceptable, so the receiver must be designed to perform adequately even when the relatively rare high level samples occur.

Two types of error can occur when an OFDM signal is quantized: clipping errors and quantization errors. Clipping errors occur when a value is outside the range of the active window of Analogue to Digital Convertor (ADC), (also called the saturation or overload region) and must be quantized at the maximum or minimum level. Quantization errors occur because the analog signals within the range of the quantizer (often called the granular region) are approximated with one of a limited number of quantization levels.

When quantizing an OFDM signal there is a trade-off between clipping and quantization noise for a given number of bits. Because Gaussian distributions have a long tail, an individual clipping event may result in a very large error; although these errors will occur infrequently. FIG. 3 shows a Gaussian signal in a system with 17 quantization levels between −2 and +2 and a sample outside the granular region which will be clipped. In this document "headroom" is the ratio of the maximum quantization level to the standard deviation of the Gaussian signal. It is often convenient to measure the headroom in dB. Thus in FIG. 3 the headroom is 20 log 10(2/1)dB or 6 dB. The distance between quantization levels will be represented by d. Thus for a system with k quantization levels $$h_r = \frac{(k-1)d}{2} \quad (1)$$

Because errors due to quantization appear as noise in communication systems, they are also called 'clipping noise' and 'quantization noise'. Quantization and clipping noise have very different statistical properties. In an OFDM system clipping will be a relatively rare event and most input samples will be subject to quantization noise. Quantization noise is a random variable. The distribution of the quantization noise depends on the characteristics of the received analog signal, but for OFDM signals will be approximately uniformly distributed between −d/2 and +d/2. A well known result is that when the signals are uniformly distributed between the quantization levels the mean square error due to quantization is given by $$E[n_q^2] = \frac{d^2}{12} \quad (2)$$

where $n_q$=number of quantization levels and d=difference between quantization levels.

For a given headroom, increasing the number of levels, reduces d and thus reduces the mean square error. Thus if the number of levels is doubled it follows from (2) that the quantization noise will be reduced by 6 dB. Similarly if the number of levels is kept constant and headroom hr is doubled (i.e. increased by 6 dB), the quantization noise will increase by 6 dB. So for each dB increase in headroom, the quantization noise also increases by a dB. Thus both the power and the distribution of the quantization noise can be simply described.

Clipping noise has more complicated characteristics. Clipping noise is impulsive in form. The impulses of clipping noise occur infrequently but may have amplitudes much larger than quantization. As the headroom increases—the probability of clipping decreases.

FIG. 4 shows the probability that a sample will be clipped as a function of headroom. The scale is logarithmic. A relatively small increase in headroom can reduce the probability of clipping by several orders of magnitude. For example, increasing the headroom from 10 to 14 db reduces the probability of clipping from $10^{-3}$ to $10^{-6}$. FIG. 5 shows how the average energy per clip varies with headroom. Increasing the headroom reduces the average energy per clip only slowly.

Determining the optimum headroom is not a simple matter and depends on a number of aspects of the overall system design. The sum of the quantization noise and clipping noise varies with headroom. As the headroom increases the quantization noise increases and the clipping noise falls.

FIG. 6 shows simulation results of mean square error versus headroom for quantization of Gaussian random variables, with varying number of bit resolution. It shows that for each number of bits there is a headroom which gives the minimum mean square error (MMSE). It might be thought that this is the optimum headroom, however in most cases the optimum headroom in an OFDM system will be a few dB above the headroom for MMSE.

To explore the distribution of errors as a result of quantizing Gaussian signals to the right and left of the minimum values we will consider the case of 16 bit representation and simulate for 16 dB headroom and 12.5 db headroom to look at the distribution of errors on either side of the minimum.

FIG. 7 shows the histogram of results for a 16 bit ADC and 16 dB headroom. The error power is normalized to the mean signal level, so the error power is a measure of noise to signal power. With this amount of headroom there is a negligible amount of clipping and the distribution of error represents the distribution of the samples between quantization levels. It is not easy to see in this histogram the frequency of 'bad samples': that is those with higher than average error power. A graph of the complementary cumulative distribution (CCD) makes the occurrence of higher power, low probability events more obvious.

FIG. 8 shows the CCD for the same data. There is a steep roll off of the graph around −82 dB. The probability of the error power in a sample exceeding this level is very low. FIGS. 9 and 10 show the equivalent results when the headroom is reduced to 12.5 dB The difference between FIGS. 7 and 9 is not very clear. However the cumulative distribution in FIG. 10 makes the effect of reducing the headroom much more obvious. There are now samples with an error power close to 0 dB. At 0 dB the error power of the sample is equal to the mean power of the signal.

The graph in FIG. 10 has two distinct regions. The region at the left is the result of the quantization noise. The region to the right is the result of clipping noise. The value at which the probability drops rapidly depends on d the space between quantization levels. Thus increasing or decreasing the number of quantization levels will move the dB at which the fall occurs. The level of the 'plateau' indicates the probability of clipping, so increasing the headroom will make the plateau occur at a lower probability.

To understand what trade off should be made between mean square noise and probability of clipping, we need to consider the OFDM receiver as a whole. FIG. 11 shows a block diagram of a typical OFDM receiver. The Gaussian signal which has been sampled and quantized is present at the input to the serial to parallel converter. An important property of OFDM signals is that the samples at this point are substantially uncorrelated. Thus clipping events will also be substantially uncorrelated. The fact that one sample is clipped does not significantly change the probability that surrounding samples will be clipped. Between the input to the serial to parallel converter and the data output from the error decoder are several blocks which have an averaging effect. These are the FFT and the error decoder.

The analysis of the effect of clipping and quantization noise is very closely related to the analysis of impulse noise in OFDM. The literature on impulse noise has shown that its effect can be predicted by using a 'noise bucket' concept. It has been found in practice and in theory that the error performance can be accurately predicted by considering the sum of the noise on all of the inputs to the FFT for one transform operation, and that the distribution of the energy among the FFT inputs has little effect. The averaging effect of the error coding depends on the system. In digital video broadcasting (DVB) there is no interleaving between symbols, so the error coder can only correct errors within one FFT operation. In some other systems there is interleaving between symbols.

FIG. 12 shows the result of averaging the noise over the parallel inputs to the FFT Here the x axis is the noise to signal ratio averaged over frames of 64 samples and of 2048 samples. This shows the effect that this noise would have in systems using 64 and 2048 subcarriers respectively. When 64 subcarriers are used, the probability that there will be a clip on one or more of the inputs increases by a factor of approximately 64 but the average noise power decreases by a factor of 64 (18 dB). Increasing the number of subcarriers to 2048 increases the averaging effect. For this example, the overall system performance would be improved if the headroom was increased, so that the probability of clips decreased. This would more than compensate for the small increase in quantization noise.

Thus although the results for mean square error shown in FIG. 6 would suggest that 12.5 dB is a close to optimum headroom, when the overall OFDM system is considered, a higher headroom gives better overall performance.

The effect of rounding and saturation in fixed point Digital Signal Processor (DSP) implementation of IFFT and FFT is shown as the disclosed embodiment of the invention with reference to orthogonal frequency division multiplexing (OFDM) which is the modulation technique used in many new and emerging broadband communication systems including wireless LANs, HDTV and 4G systems.

The key component in an OFDM transmitter is an inverse fast Fourier transform (IFFT) and in the receiver, an FFT. The size of the transform depends on the application, and ranges from 64-point in some wireless local area network (LAN) standards to 8192-point in some broadcast digital television systems. The increasing computational power and performance capabilities of DSPs make them an ideal candidate for the practical implementation of OFDM functions. Practical consumer products are usually sensitive to cost and power consumption and for this reason, a fixed-point DSP approach is preferred. However, fixed point systems have limited dynamic range, causing the related problems of round-off noise and arithmetic overflow.

An approach to FFT design is to scale the signal so that overflow is avoided. For OFDM systems using larger FFTs and fixed-point implementation, a large word length is required if rounding errors are not going to significantly degrade system performance. In the worst case, for an N-point FFT, the values at the FFT output can have a maximum value N times the maximum input value so that scaling by a factor which depends on N is required between input and output. Normally scaling is distributed throughout the FFT structure as this reduces the overall effect of rounding errors. To completely eliminate the possibility of overflow in a radix 2 implementation, numbers must be scaled by a factor of one half after each butterfly stage. Another way to avoid overflow is to use Block Floating Point scaling. This adapts the scaling at each stage of the FFT according to the data so that overflow does not occur for the given input data.

However the invention provides a new approach which is better suited to FFT design for OFDM. In OFDM it is the statistics of the total mean square error across all outputs of the receiver FFT which should be optimized, rather than minimizing the peak error in any one value. This is because of the spreading effect of the FFT and because OFDM normally uses some form of error correction or detection, so a large error in some FFT outputs can be corrected as long as the errors in other outputs are small.

The optimum statistics can be achieved by allowing overflow to occur with some low probability rather than by avoiding overflow. The size of the error that results from an overflow depends on how overflow is handled in the DSP. To minimize the degradation, overflow should result in saturation of the value at the maximum positive or negative value option. This is equivalent to clipping the signal.

Using the new technique, signals within the FFT structure are scaled to optimize the mean square error. If the signal is too large, the probability of clipping increases. If the signal is too small, the rounding error becomes larger relative to the signal level. The optimum scaling depends on the statistical properties of the signal at each stage within the IFFT/FFT structure.

Results show that IFFT/FFT structures can be designed using the new technique, which for a given fixed point precision, significantly outperform traditional techniques which avoid clipping. The improvement that can be achieved increases as the size of the FFT increases. The system complexity is similar to that of traditional fixed scaling and is lower than the complexity of block floating point. The ramifications on the practical implementation of the above schemes on a fixed-point DSP have also been determined.

The issue of arithmetic overflow is important particularly for OFDM systems using larger FFTs. If the FFT is designed with scaling so that no input condition can cause overflow, the rounding errors become very significant and may result in an unacceptable signal to noise ratio (SNR) for the signal.

Another approach is to allow arithmetic overflow to occur with some low probability. This will also result in some noise in the signal. The level of the noise depends on how overflow is handled in the DSP and where, within the FFT butterfly structure, the overflow occurs. To minimize the degradation, overflow should result in saturation of the value at the full-scale positive or negative value. This is equivalent to clipping the signal. Clipping at the output stage effects only the outputs of a single butterfly. Clipping at earlier stages results in all outputs that depend on that butterfly being affected FIGS. 13(a) and 13(b) show respectively a simplified block diagram of an OFDM transmitter and receiver. Some of the blocks which are unimportant in the context of FFT design are omitted. The key component of the transmitter is the IFFT block and of the receiver the FFT block.

The data to be transmitted is first serial-to-parallel converted and then mapped onto complex numbers representing values from the signal constellation which is being used such as the 16 point signal constellation shown in FIG. 13(a). Each input controls the signal at one frequency. The IFFT performs in one operation the modulation of each subcarrier and the multiplexing of these subcarriers. The signal is then parallel to serial converted, converted to analogue, and modulated onto a high frequency carrier. The details of how this is achieved and the order of the blocks may vary in practice.

At the receiver the signal is downconverted, converted to digital and serial to parallel converted before being input to the FFT. The FFT performs demodulation and demultiplexing of each subcarrier. If the channel causes no noise or distortion then the outputs of the receiver FFT would be identical to the inputs of the transmitter IFFT. In practice, the channel distorts the signal and noise is added. The distortion in the channel has the effect of changing the phase and amplitude of each subcarrier. This is corrected by the single tap equalizer which multiplies each output of the FFT by a complex number which compensates for the phase and amplitude changes. The data is then input to the error decoder. OFDM is normally used in conjunction with error decoder means for error correction because subcarriers which lie in deep fades will have very high error rates. The presence of the error decoder means that the overall error rate does not depend on the noise in any one of the FFT outputs, but on the statistics of the noise across all FFT outputs. This is closely related to the 'noise bucket' effect which has been observed for impulse noise in OFDM.

The FFT is an algorithm for calculating the DFT. A number of different algorithms exist such as the decimation in time, decimation in frequency, radix 2, radix 4 etc. However they all use a butterfly structure. FIGS. 14(a) and 14(b) show the butterfly structure for of an 8 point radix 2 FFT and an individual butterfly showing noise due to truncation such as rounding error. The FFT algorithm is based on a butterfly structure.

Each butterfly involves multiplication and addition. When fixed-point arithmetic is used, rounding and possibly overflow occur. The precise points within the butterfly at which these may occur depends on details of the implementation. Scaling factors may also be used between stages. In the Matlab® of Mathworks simulations, the structure in FIG. 14(c) was used to model each stage. Quantization was modeled only at the output of each stage. Infinite precision was assumed within each stage. At each butterfly, two inputs are multiplied by two twiddle factors and the sum and difference of the products are calculated.

The butterfly structure of an 8 point radix 2 FFT with scaling factors of FIG. 14(a) is applied on a Digital Signal Processor. This embodiment of a Digital Signal Processor (DSP) has a fixed number of processing bits with the processor having an input for receiving signals, a calculation block for processing the signals and an output for outputting said processed signals; the calculation block including a Fast Fourier Transform (FFT) or Inverse Fast Fourier Transform (IFFT) structure and programmed to allow a predetermined amount of saturation of signals received at the input in the FFT or the IFFT structure.

The calculation block of the Digital Signal Processor is configured to process the real and imaginary components of the signals, which have a Gaussian or approximately Gaussian distribution, and the headroom being the ratio of the maximum quantization level to the standard deviation of the Gaussian signal, selected to provide a predetermined mean square error (E) due to quantization given by $$E[n_q^2] = \frac{d^2}{12}$$

where $n_q$ is the number of quantization levels and d is the distance between quantization levels.

The Digital Signal Processor has a plurality of stages in the calculation block acting on a cumulative distribution of the real and imaginary components of the signals having a Gaussian or approximately Gaussian distribution. As shown in FIG. 18, the scaling at each calculation stage is on the input of each part as shown with the scaling being ½ and on the right there is no scaling (i.e. 1). The calculation block is configured to process the real and imaginary components of the signals within the active window and the signals are quantized to one of a limited number of quantization levels for processing according to a transform by the predetermined plurality of butterfly stages of the calculation stages of the calculation block.

To understand the overall system performance the statistics of the symbol distortion must be considered. Because error correction or detection in many systems operates on a symbol by symbol basis, the symbol distortion in each symbol is important. A high distortion in one symbol cannot be compensated for with a low distortion in another symbol.

To design the FFT or IFFT to optimize the statistics of the symbol distortion for a given number of bits in a fixed point implementation, we need to determine the statistical characteristics of the signals throughout the transmitter FFT and the receiver IFFT.

In the transmitter the signals at the input to the transmitter IFFT depend on the signal constellation. If 4 QAM is being used, each complex input has one of four possible values ±1 ±j (probably multiplied by a scaling factor). For 16 QAM there are 16 possible input values and for 64 QAM there are 64.

The signals within the IFFT and FFT in an OFDM system are complex random variables. The effect of rounding and clipping depends on the probability distribution of the signals throughout the FFT and IFFT structures. FIGS. 15(a) and 15(b) graph the complementary cumulative distribution for the real components at various stages in the transmitter IFFT structure. No scaling is used, so the mean square values of the signals grow at each stage as signals from the previous stages are summed. This form of representation is used as it makes it easy to compare the tails of the distributions. These are critical in a design which uses clipping, as it must be ensured that the probability of clipping is not too high. FIG. 15(a) shows the distributions for 4 QAM. For the first three stages the outputs clearly do not have a Gaussian distribution, however by the fourth stage, the tail of the distribution is quite close to Gaussian and after the fourth stage the difference from a Gaussian distribution is negligible. FIG. 15(b) shows the distributions for 64 QAM. Because of the greater number of possible input values, the signal becomes approximately Gaussian at an earlier stage.

Another important point to note in FIGS. 15(a) and 15(b) is that when the input to any stage is Gaussian, the output is Gaussian with an increase in power of 3 dB. That is the average power has increased by a factor of two and the amplitude by √2. Note that although the maximum signal increases by a factor of two the average amplitude increase by √2 This means that using the 'classical' method of FFT design where a scaling factor of 0.5 is used at each stage results in a decrease in average power by 3 dB at each stage.

Most OFDM systems use 64 or more subcarriers and it has been found that the distributions of the real and imaginary components of the signal at the output of the transmitter IFFT are very close to Gaussian.

The analysis of the signals in the receiver FFT is more complex as it depends on the communications channel. In the case of an 'ideal' channel which causes no distortion and adds no noise, the distributions in the receiver IFFT are identical to those in the transmitter FFT, but in reverse order. In other words the distributions are Gaussian at the early stages and at the output take discrete values from the signal constellation. In practice even the most benign radio channel will cause the phase changes to the received subcarriers which can be substantially to be uniformly distributed in the range −π to +π, and as a result the distribution even at the FFT output is continuous rather than discrete. Although the distribution depends on the channel and will not usually be Gaussian, it shares the property that large values occur relatively rarely and small values are more common In light of the realization that at many points within the IFFT and FFT the real and imaginary components of the signal have at least substantially Gaussian distribution it is possible to determine optimum quantization of the Gaussian signals. The key question is therefore how to represent this signal in a way which optimizes the statistics of the symbol distortion. This problem has not previously been analyzed in the context of FFT design in OFDM however if clipping as well as rounding is allowed, the problem is very closely related to the problem of optimum quantization of a Gaussian signal. For a given number of bits, there is a trade off between large quantization steps which results in small probability of clipping and large rounding error and small quantization steps with high probability of clipping and small rounding errors. This problem has been addressed in the literature in the context of analog to digital converters.

Quantization of Gaussian random variables has been extensively studied in the past both in general and in the context of design of analog-to-digital converters (ADCs) for OFDM. These results can be directly applied to the problem of saturation and rounding in fixed-point arithmetic. To describe the properties of a uniform quantizer, three related parameters must be defined. These are d, the distance between quantization levels, k, the number of quantization levels, and $h_r$, the headroom which is the maximum quantization level. Throughout this document $h_r$ is normalized to the root mean square (RMS) value of the signal. When quantization is symmetrical about zero, the three parameters are related by $$h_r = \frac{(k-1)d}{2}. \tag{3}$$

Quantization and clipping noise have very different statistical properties. In an OFDM system, clipping will be a relatively rare event but most samples will be subject to quantization noise. Usually the quantization noise is approximately uniformly distributed between −d/2 and +d/2. For a given $h_r$, if k is doubled, the quantization noise will be reduced by 6 dB. Similarly if k is kept constant and $h_r$ is increased by 6 dB, the quantization noise will increase by 6 dB. Clipping noise has more complicated characteristics. It is impulsive in form. The impulses of clipping noise occur infrequently but may have amplitudes much larger than quantization noise. As $h_r$ increases, the probability of clipping decreases.

FIG. 16 shows the minimum mean square error (MMSE) as a function of headroom for varying numbers of bit resolution.

"Headroom" is defined as the ratio of the maximum quantization level to the root mean square (rms) value of the real component of the signal. FIG. 10 shows the complementary cumulative distribution for the error in quantizing a Gaussian variable when a headroom $h_r$ of 12.5 dB and $k=2^{16}$, i.e. 16 bits are used to represent each value. The graph has two distinct regions. The region at the left is the result of the quantization noise. The region to the right is the result of clipping noise. The noise to signal level at the transition between regions depends on d. The level of the 'plateau' indicates the probability of clipping, so increasing $h_r$ makes the plateau occur at a lower probability. However, because of the infinite tail of the Gaussian distribution, there is always a non-zero probability of clipping and the graph will have the same basic form irrespective of the value of the parameters.

Returning to FIG. 6 there is shown mean square error for a Gaussian signal versus number of quantization levels for values for 8 ,10, 12, 14, 16 bit resolution. It shows that for each number of bits there is a headroom which gives the minimum mean square error (MMSE). However the MMSE headroom does not necessarily give best system performance in OFDM. The effect of low probability, high noise and clipping events must also be considered. It can be seen from FIG. 6 shows that when 8 bits or more are used to represent a Gaussian variable, the headroom which minimizes the mean square error per sample is between 10 and 15 dB.

It is also useful to know how sensitive the mean square error is to the actual headroom. In other words whether moving slightly from the minimum point increases the mean square error significantly.

FIG. 6 shows that as the number of bits increases the minimum mean square error falls. The minimum value is quite a sensitive function of head room, particularly if the headroom is below the optimum. In this case too many signal samples are being clipped. In contrast the mean square error does not increase very rapidly if the headroom is too high. The effect of too large a headroom is just a small increase in rounding error.

To design better OFDM transmitters and receivers, fixed scaling factors for the transform structures need to be considered to optimize the symbol distortion. The performance is compared with transforms using block floating point implementations, where a scaling is performed at each stage depending on whether the particular data will cause an overflow.

The information in the above will now be brought together to show how an FFT with controlled clipping can be designed for a particular OFDM application.

To summarize the key results of the previous sections:
(a) The performance for an OFDM symbol depends on the statistics of the total noise added to the symbol;
(b) The signals at many points within the IFFT and FFT have a Gaussian distribution;
(c) When a Gaussian signal is quantized there is a trade-off between clipping errors and rounding errors which depends on the headroom of the quantizer;
(d) At each stage, at least for Gaussian or approximately Gaussian distributed signals, within an FFT the signal power doubles, so the average amplitude increases by $\sqrt{2}$.

The optimum design and selection of scaling adjusts the signal power throughout the FFT/IFFT so that the headroom at each point gives the optimum compromise between clipping and rounding. The optimum value depends on many aspects of the overall system design, including the number of subcarriers, the power and statistics of other sources of noise, and the number of bits used in fixed-point representation. For Gaussian signals the optimum headroom is generally slightly above the headroom for MMSE. To maintain the optimum headroom throughout the transform, the signal power should be kept constant or approximately constant. For a radix-2 based structure, the optimum scaling factor is therefore $1/\sqrt{2}$ at each stage. A slightly suboptimum structure, which is more readily implemented on a DSP, is to scale by 1 and ½ (simple shift left) at alternate stages.

Matlab® simulations were used to examine the performance of OFDM receivers incorporating FFTs designed using the new technique, and were compared with the performance using conventional fixed scaling and block floating point implementations. FIG. 17 shows the model used in the receiver simulations.

To understand the effect of the design of the receiver FFT on overall system performance, account must taken of how the signals are represented in fixed-point form at the input to the FFT. There appears little point in designing an FFT to totally avoid clipping, when inevitably the signal at the input has already been limited by the finite range of the analog to digital conversion (ADC).

In FIG. 17 this is indicated by the 'ADC' block. However, in practice, this conversion from high frequency analog to baseband digital will involve a number of functions. The amount of clipping which will occur in the FFT depends directly on the headroom of the ADC. The simulations included the effect of the ADC. Each of the radix-2 butterfly stages in FIG. 17 has the structure shown in FIG. 14(c). Scaling occurs at the input to the block and quantization at the output, except for the first stage in FIG. 17 which has no scaling as this is equivalent to changing the input power and the form of the input ADC. The input signal was modeled as a complex signal with Gaussian real and imaginary components. In practice the form of the received OFDM signal will depend on the channel. The performance for Gaussian inputs gives a good indication of the likely performance for most channels, and the relative performance of different designs of FFT.

Simulations were run for different designs of FFT. The MSE of the output from the new technique was calculated in two ways: per sample and per symbol. The "error per sample" was calculated for each complex value at the FFT output for each transform operation. The "error per symbol" was calculated by averaging the MSE per sample for each transform operation. The second method gives a better indication of the performance in an OFDM system because, in most systems, the error coding operates only on a symbol by symbol basis with no interleaving between symbols. Results were considered for four different FFT designs: the new technique using scaling of $1/\sqrt{2}$ at each stage; the new technique using scaling of 1 and 0.5 at alternate stages; a conventional FFT design with scaling of 0.5 at each stage; and an FFT using BFP. The impairment caused by the ADC alone was also calculated. Simulations were performed for a number of values of FFT size, N, and varying number of bits, b, of fixed-point precision.

FIG. 19 shows the MSE per sample for different FFT designs and for the ADC alone using 16 bit precision. The error for the ADC alone falls as the headroom increases from 0 dB to approximately 14 dB. The results for the FFTs have a generally similar form. The minimum has increased by 3 dB, but this is because there is a 3 dB rise in power between the input to the ADC and the quantization at the first butterfly. In other words the minimum is also occurring at around 14 dB headroom for the quantization stages. This is consistent with the results in FIG. 6 for quantization of Gaussian variables. To the right of the minimum, most of the graphs slope up with a gradient of unity. The conventional design using scaling of 0.5 at each stage has the worst performance. This is because the signal power is decreasing at each stage. The two versions of the new technique give better performance, with only a small penalty for using the alternating 0.5 and 1 scaling.

The performance for BFP shows very significant changes as the headroom changes slightly. The results for BFP also vary dramatically between simulation runs. This is because the performance is dominated by very low probability 'bad symbols'. These are symbols with very high peak to average ratio which cause the BFP to scale by 0.5 at every stage to avoid clips. This results in high values of rounding noise. The performance for these bad symbols can change significantly for small changes in headroom. This is because if the high peak is clipped at the ADC, less scaling is required by the block floating point.

FIG. 20, 21 and 22 show how the MSE varies with the number of subcarriers for different designs. Comparing FIG. 20 and 21 it can be seen that for the new design the performance degrades much less with increasing N. For BFP the performance is much less sensitive to headroom as the variable scaling compensates to avoid clipping.

In OFDM the per symbol statistics are also important. FIGS. 23 and 24 show the CCD for conventional 0.5 weighting and the new method using alternating 0.5 and 1 weighting for values of $h_r$ just below and above the value for MMSE per sample. The parameters are the same as for FIG. 19. In FIG. 25, it can be seen that although $h_r$=14 dB results in a low MSE per symbol for most symbols, there is a plateau around 0.05. In other words, when $h_r$=14 dB, around 5% of symbols have higher values of MSE per symbol. When the threshold is increased, the probability of the plateau falls rapidly and for 18 and 20 dB is no longer visible on the graph. However because of the infinite nature of the Gaussian distribution, there will always be a plateau. The headroom should be chosen so that the probability associated with this plateau is acceptable. This will usually be slightly above the headroom for MMSE. FIG. 24 shows the results for the new method. Note that the noise power is significantly lower.

In order to demonstrate the feasibility of implementing these new scaling methods on a DSP, code was written for an Analog Devices Blackfin® processor. This processor features both DSP and MCU functionality. The Blackfin processor used in this case was an ADSP-BF533 which features up to 1,512 MMACs (Mega Multiply Accumulates per second), 1.2 Mbits of high speed SRAM and extremely low power consumption.

The code was adapted from the current range of FFT algorithms readily available from the Blackfin website. The implementation is already highly optimised and takes full advantage of the existing Blackfin instruction set support for the FFT. The Analog Devices VisualDSP++ IDE (Integrated Development Environment) was used to implement and debug the code.

An example of the principle with a 'decimation in time' butterfly. Each butterfly has two output results: the upper and the lower. The upper is called a, and the lower, b. The twiddle factor is $W_n$. The code for the embodiment of DIT Butterfly in the simulation included the following:

Upper Output: $O_a = I_a + W_n \cdot I_b$
Lower Output: $O_b = I_a - W_n \cdot I_b$ All numbers are complex. The DSP needs to perform these calculations using discrete multiplications. Therefore they need to be broken into real and imaginary components. In the following formulas the 'a' and 'b' parts of the '$O_b$' are dropped for clarity.

$$W = W_r + W_i \cdot i$$
$$I = I_r + I_i \cdot i$$
$$I \cdot W = (W_r + W_i \cdot i) \cdot (I_r + I_i \cdot i)$$
$$= W_r \cdot I_r - W_i \cdot I_i + (W_i \cdot I_r + W_r \cdot I_i) \cdot i$$

When calculating $O_a$ two separate results are calculated; the real and imaginary:

Real part: $O(a) = I(a)_r + [W_r \cdot I(b)_r - W_i \cdot I(b)_i]$
Imag part: $O(a) = I(a)_i + [W_i \cdot I(b)_r + W_r \cdot I(b)_i]$ Calculating $O_b$ is virtually identical.

Real part: $O(b) = I(a)_r - [W_r \cdot I(b)_r - W_i \cdot I(b)_i]$
Imag part: $O(b) = I(a)_i - [W_i \cdot I(b)_r + W_r \cdot I(b)_i]$ Therefore real part has two multiplications and three additions/subtractions. In the code presented below, scaling is performed on every butterfly stage and represents an example.

First of all, a loop for the number of stages—3 is set. It is a general implementation of butterfly computation. The first nested loop is set for half of the number of butterflies at each stage. The second nested loop is set for the number of lines in each butterfly. The computation is done on the output array. The output is stored after dividing by 2 for scaling purpose. In one loop two butterfly data are read and processed.

```
            I0 = B0;
            I2 = B2;
            I3 = B2;              //Address of output array.
            P0 = P3 << 2;
            M2 = P0;              //M2 holds the offset of counterpart line.
            P0 += -4;
            M0 = P0;
            P5 = P5 >> 1;
            R7 = R7 >>> 1 || I3 += M2;
            M1 = R7;
            P3 += -1;
            lsetup(Loop1_strt, Loop1_end) LC0 = P5;
                                  //Loop is set for number of the butterfly
Loop1_strt:
            I1 = B3;              //Address of twiddle factor.
            R2 = [I2++];
            R3 = [I1++M1] || R4 = [I3++];
            lsetup(Loop2_strt, Loop2_end) LC1 = P3;
                                  //Loop is set for the number of lines
```

```
Loop2_strt:
            R5 = R2 +|+ R4,
                            R6 = R2 -|- R4 (ASR) || R3 = [I1++M1]
                    || R4 = [I3++];
            A1 = R3.L * R4.H,
                            A0 = R3.L * R4.L || [I0++M2] = R5 || R2 = [I2++];
Loop2_end: R4.H = (A1 += R3.H * R4.L), R4.L = ( A0 -= R3.H *
R4.H)
                            || I0 -= M0 || [I0] = R6;
            R5 = R2 +|+ R4, R6 = R2 -|- R4 (ASR) || I2 += M2;
                I3 += M2 || [I0++M2] = R5;
Loop1_end:
                    [I0++] = R6;
                      P3 += 1;
                      P3 = P3 << 1;
                      R0 += -1;
                      B1 = B0;
                      B0 = B2;
                      B2 = B1;
        CC = R0 == 0;
        If !CC Jump Loopfor_m (BP);
                    //Loop for m.
                jump Esc_mid;
```

Here is an example of a butterfly implementation where shifting is not performed on each butterfly stage. In this example shifting is only performed on every second butterfly stage.

```
cc = bittst(R0, 0);
  if cc jump NO_SHIFT;
  I0 = B0;
  I2 = B2;
  I3 = B2;           //Address of output array.
  P0 = P3 << 2;
  M2 = P0;           //M2 holds the offset of counterpart line.
  P0 += -4;
  M0 = P0;
  P5 = P5 >> 1;
  R7 = R7 >>> 1 || I3 += M2;
  M1 = R7;
  P3 += -1;
  1setup(Loop1a_strt, Loop1a_end) LC0 = P5;
           //Loop is set for number of the butterfly
Loop1a_strt:
  I1 = B3;           //Address of twiddle factor.
  R2 = [I2++];
  R3 = [I1++M1] || R4 = [I3++];
  1setup(Loop2a_strt, Loop2a_end) LC1 = P3;
           //Loop is set for the number of lines
Loop2a_strt:
  R5 = R2 +|+ R4, R6 = R2 -|- R4 (ASR) || R3 = [I1++M1]
  || R4 = [I3++];
  A1 = R3.L * R4.H,
       A0 = R3.L * R4.L || [I0++M2] = R5 || R2 = [I2++];
Loop2a_end: R4.H = (A1 += R3.H * R4.L),
       R4.L = ( A0 -= R3.H * R4.H)
  || I0 -= M0 || [I0] = R6;
  R5 = R2 +|+ R4, R6 = R2 -|- R4 (ASR) || I2 += M2;
  I3 += M2 || [I0++M2] = R5;
Loop1a_end:
  [I0++] = R6;
  P3 += 1;
  P3 = P3 << 1;
  R0 += -1;
  B1 = B0;
  B0 = B2;
  B2 = B1;
  CC = R0 == 0;
  If !CC Jump Loopfor_m (BP);
           //Loop for m.
NO_SHIFT:
  I0 = B0;
  I2 = B2;
  I3 = B2;           //Address of output array.
  P0 = P3 << 2;
  M2 = P0;           //M2 holds the offset of counterpart line.
  P0 += -4;
  M0 = P0;
  P5 = P5 >> 1;
  R7 = R7 >>> 1 || I3 += M2;
  M1 = R7;
  P3 += -1;
  1setup(Loop1b_strt, Loop1b_end) LC0 = P5;
           //Loop is set for number of the butterfly
Loop1b_strt:
  I1 = B3;           //Address of twiddle factor.
  R2 = [I2++];
  R3 = [I1++M1] || R4 = [I3++];
  1setup(Loop2b_strt, Loop2b_end) LC1 = P3;
           //Loop is set for the number of lines
Loop2b_strt:
  R5 = R2 +|+ R4, R6 = R2 -|- R4 || R3 = [I1++M1]
  || R4 = [I3++];
  A1 = R3.L * R4.H,
       A0 = R3.L * R4.L || [I0++M2] = R5 || R2 = [I2++];
Loop2b end: R4.H = (A1 += R3.H * R4.L),
       R4.L = ( A0 -= R3.H * R4.H)
  || I0 -= M0 || [I0] = R6;
  R5 = R2 +|+ R4, R6 = R2 -|- R4 || I2 += M2;
  I3 += M2 || [I0++M2] = R5;
Loop1b_end:
  [I0++] = R6;
  P3 += 1;
  P3 = P3 << 1;
  R0 += -1;
  B1 = B0;
  B0 = B2;
  B2 = B1;
  CC = R0 == 0;
  If !CC Jump Loopfor_m (BP);
```

Matlab® was used as the data generation and analysis tool. The FFT function in Matlab® was used to provide a reference FFT implementation and also for generating the input noise samples. Matlab® scripts were also written to analyse the results.

In this particular case a 256-point radix-2 decimation in time algorithm was chosen for the implementation. The algorithm implements a 16 bit complex FFT. Two scaling methods were compared; the first was the standard scaling method of scaling by one half at every butterfly stage. The second method was scaling by one half at every second butterfly stage.

A test harness was created where Gaussian distributed input data was generated and passed to the DSP implementation via means of an input file. The DSP test harness reads the input data and processes the data through the DSP code producing an output file which is read by the Matlab® script and analysed.

The DSP implementation takes advantage of a very useful tool provided in VisualDSP++, called the compiled simulator. The compiled simulator generates an x86 PC based executable which simulates the DSP program to the bit-exact level. This PC executable allows full debug capabilities, while running thousands of times quicker than a standard simulation. The compiled simulator is especially useful in this case since it can also be invoked directly as an executable from Matlab®. The compiled DSP executable reads files off the PC hard drive, allowing for simple creation of batch testing and analysis.

In the Matlab® analysis, the output data from the DSP is compared with the reference FFT implementation provided in Matlab®. The MSE is calculated by comparing these two results. The level is varied across the complete 16 bit range of the input precision and the MSE is plotted against the level.

The results are presented in FIG. 25. All curves in FIG. 25 are the result of processing Gaussian distributed inputs. Note how the performance of the FFT improves as the signal level increases. This is due to the roundoff error becoming less significant as the signal level increases. With standard scaling the best MSE seen is −59.3 dB. With alternate scaling, the best MSE seen is −73.3 dB. This improvement can be attributed to the scaling of the intermediate signals of the FFT reducing the effect of round-off noise while allowing controlled saturation.

The cycles required to implement this FFT on the ADSP-BF533™ is 3171. The code size is 500 bytes. The data size is mainly comprised of the twiddle table, and the input and output data arrays totaling to about 3000 bytes for the 256-point complex FFT. To implement the alternate scaling scheme merely required an extra 80 cycles, an extra 100 bytes of code space, and no extra data space.

There are an extremely large number of possible FFT types, sizes and precision possibilities. This particular example showed an improvement of around 15 dB in the MSE of the result, with very little cycles overhead. The improvement is greater for larger FFT sizes. This improvement is significant enough that it could either improve the performance of the OFDM implementation, allow a smaller/faster implementation on a DSP, or allow the implementation of silicon-based designs using fewer bits. The improvements in a silicon-based design will come from lower memory requirements and fewer bits required in the arithmetic units. This translates into smaller die area, lower power consumption and reduced costs.

The overall error caused by fixed point implementation depends on the error introduced at each stage. In the following it is assumed that the errors in one stage are independent of errors in any other stage. This will be exactly true for the rounding errors and approximately true for errors due to clipping. If saturation occurs in one value in one stage it slightly increases the probability that clipping will occur in the subsequent butterflies which use this value as input, but this is a second order effect which is negligible in practice. Thus the problem can be simplified by designing each stage in the FFT structure independently.

In the transmitter IFFT, for the first few stages of the transmitter IFFT the signal values have a discrete distribution. The number of stages with discrete distributions depends on the constellation size. In these stages the scaling should be designed so that the maximum possible value will not be clipped. This is necessary because these values occur so frequently that the clipping noise that they would cause is far more than any reduction in rounding error. At the later stages the scaling should be $1/\sqrt{2}$. Extensive simulations (results not shown) indicate that fine tuning the gain in the first few discrete stages gives only very slight improvement, particularly for the 64 QAM case.

FIGS. 26 to 30 show plots of the signal to noise ratio at the IFFT output for different design criteria-fixed $1/\sqrt{2}$ scaling, alternating 0.5 and 1 scaling, fixed 0.5 scaling and block floating point. FIG. 26 shows the SNR at the IFFT output for 8 bit arithmetic and varying FFT size, as a function of the power level at the IFFT input. It shows that with careful design a very low level of noise can be achieved using only 8-bit arithmetic. The minimum mean square error occurs at input levels around −15 dB. This is 3 dB above the minimum level for Gaussian signals because the rounding and clipping is occurring after two signals are added together giving an average 3 dB rise in signal level. The general form of the graph is similar to FIG. 6 but with the x-axis inverted. This is because increasing input power corresponds to decreasing headroom. Above the optimum power input the SNR falls rapidly because clipping is occurring more frequently, below the optimum power the fall in SNR is less rapid, as the rounding error increases only slowly. The SNR reduces as the size of the transform increases because for each doubling in the size of the IFFT requires another stage in the transform. However the noise increases only linearly with number of stages, so there is little degradation with increasing N.

FIG. 27 shows the effect of increasing the precision for 64 QAM and a 64 point IFFT. Increasing the precision by two bits results in a 12 dB reduction in the noise.

FIG. 26. SNR at IFFT output as a function of input signal power for IFFT designed with fixed scaling factor of $1/\sqrt{2}$ at each stage and 8 bit fixed point precision, Results for 64, 128, 256, 512, 1024 point IFFT and 64 QAM modulation FIG. 27. SNR at IFFT output as a function of input signal power for IFFT designed with fixed scaling factor of $1/\sqrt{2}$ at each stage 64 point IFFT and 64 QAM modulation. Results for 6, 8, 10, 12, 14, 16 bit fixed point precision.

The factor $1/\sqrt{2}$ is not readily implemented in digital signal processing, so simulations were performed to investigate whether using alternately 1 and 0.5 as scaling factors would significantly degrade the performance. A factor of 0.5 can be implemented in digital signal processing by simply right shifting the bits. The results are shown in FIG. 28. The maximum SNR is reduced by 2-3 dB Simulations were also performed for other IFFT structures. A common technique is to use a scaling factor of 0.5 at each stage as this guarantees that overflow will never occur. FIG. 29 shows the results of simulations of this technique. The performance is much worse than for the new technique and the degradation is worse for larger point IFFTs. This is because the signal level is reducing at each stage. The overall reduction in SNR is because the signal is reducing not because of the noise increasing.

Finally the performance of systems using block floating point were investigated. At each stage, for each transform operation the system checked for possible overflow. If overflow would occur in any of the outputs in that stage, all of the values were multiplied by 0.5. The results are presented in FIG. 30. The use of block floating point results in a flatter graph. The choice of input level is not so critical as the scaling factors adjust to compensate. For N=64 the minimum mean square error performance is similar to the new technique however the performance degrades more quickly as N increases. This is because the probability of a large signal sample is greater for larger N.

Comparing FIGS. 28 and 30 we can see that for larger N significantly better performance can be achieved using the new method than with block floating point. This better performance is achieved with lower signal processing complexity.

FIG. 28. SNR at IFFT output as a function of input signal power for IFFT designed with fixed scaling factor of alternately 0.5 and 1 at each stage and 8 bit fixed point precision, Results for 64, 128, 256, 512, 1024 point IFFT and 64 QAM modulation FIG. 29. SNR at IFFT output as a function of input signal power for IFFT designed with fixed scaling factor of 0.5 at each stage and 8 bit fixed point precision, Results for 64, 128, 256 point IFFT and 64 QAM modulation FIG. 30. SNR at IFFT output as a function of input signal power for IFFT designed using block floating point at each stage and 8 bit fixed point precision, Results for 64, 128, 256, 512, 1024, 2048 point IFFT and 64 QAM modulation It should be understood that the above is illustrative only and not limiting on the invention. Clearly persons skilled in the art will understand the above and without any addition of inventiveness understand variations and improvements on the above and such is included within the scope of the invention.

For example the above system can be applied to differing bit FFT and to different radix transforms. Different radices will have differing performance and higher radix FFT's can perform better. Also, different saturation and exponent detection regimes can be used.

Further is the possibility of implementing a full or partial DFT to allow maximum precision. Using a DFT on the early stages of the FFT, and then butterflies later. In this way an advantage can be taken of full precision in the early stages of the Fourier transform.

Embodiments of the invention are applicable to multicarrier modulation systems that use any suitable scheme to modulate subcarriers. For example, phase-shift keying or quadrature amplitude modulation can be used. In principle, embodiments can use modulation schemes that are suitable for multicarrier modulation systems generally.

Embodiments of the invention are applicable to input data having an arbitrary statistical distribution. For instance, the input data may be previously coded using an error correcting code, by source coding or by any other relevant coding scheme, for example, code division multiple access (CDMA).

Embodiments of the invention are suitable for terrestrial as well as wireless systems. Various applications of particular embodiments include: (a) digital transmission over the public telephone network (for example, asymmetric digital subscriber loop (ADSL) and high-rate digital subscriber line (HDSL)) (b) digital audio broadcasting (c) digital mobile telephony (d) digital television broadcasting (e) satellite communications (f) wireless local area networks.

Other applications, such as in relation to high bandwidth data storage technologies are also possible. While embodiments of the invention are described in relation to carrier systems, the principles of the invention are also applicable to baseband systems.

The invention claimed is:

1. A method of receiving data in a multicarrier modulation system, comprising:
providing a receiver including an input, a calculation block and an output, the calculation block having a plurality of interconnected calculation stages for numerical calculation on a signal received at the input, and providing an output derived from the signal received at the input according to the numerical calculation; and
scaling, in the calculation block of the receiver, the signal to allow a predetermined low probability of saturation of the signal, the calculation block comprising a Fast Fourier Transform (FFT) structure, the FFT structure having two or more calculation stages and the scaling of the signal being performed at the calculation stages within the FFT structure, with the predetermined low probability of saturation being determined by providing a numerical calculation and scaling by the plurality of butterfly stages of the calculation block resulting with headroom being greater than headroom at the minimum mean square error due to quantization.

2. The method of claim 1 with the predetermined low probability of saturation being allowed in a predetermined plurality of calculation stages of the calculation block.

3. The method of claim 2 including an error detection and correction step in the receiver.

4. The method of claim 3 with the predetermined plurality of calculation stages of the calculation block selected to provide a substantially Gaussian distribution of signals.

5. The method of claim 2 using orthogonal frequency division multiplexing (OFDM).

6. The method of claim 5 including an error detection and correction step in the receiver.

7. The method of claim 6 in which the calculation block is undertaken on a Digital Signal Processor (DSP).

8. The method of claim 2 in which the calculation block is based on any one or more of a processor, microprocessor, microcontroller, microcomputer, FPGA, CPLD, PLD, ASIC, sea of gates, programmable device, discrete logic chips, discrete analog, digital or passive components, or any other implementation technique useable with OFDM application.

9. The method of claim 1 with the signals represented by complex numbers and with the calculation stages undertaking arithmetic numerical calculations of said represented complex numbers wherein the allowed clipping due to saturation is limited in a predetermined manner by controlling the scaling according to statistical properties of the cumulative signal in the calculation block.

10. The method of claim 9 with the scaling at each calculation stage is $1/\sqrt{2}$ at each stage in a radix 2 based transform.

11. The method of claim 9 with the scaling at each calculation stage is alternately 1 and ½ at subsequent stages in a radix 2 based transform.

12. The method of claim 9 with the scaling at each calculation stage is ½ at each stage of a radix 4 transform.

13. The method of claim 1 with the real and imaginary components of the signals having a Gaussian or approximately Gaussian distribution in at least one calculation stage.

14. The method of claim 13 with the predetermined low probability of saturation being determined by balancing clipping error and quantization including by the calculation block providing a numerical calculation and scaling resulting with headroom, which is the ratio of the maximum quantization level to the root mean square (rms) value of the real component of the signal, being greater than headroom for the minimum mean square error due to quantization in which the mean square error (E) due to quantization is given by $$E[n_q^2] = \frac{d^2}{12}$$

where $n_q$ is the number of quantization levels and d is the distance between quantization levels.

15. The method of claim 1 including an error detection and correction step in the receiver.

16. The method of claim 1 using orthogonal frequency division multiplexing (OFDM).

17. The method of claim 1 in which the calculation block is undertaken on a Digital Signal Processor (DSP).

18. The method of claim 1 in which the calculation block is based on any one or more of a processor, microprocessor, microcontroller, microcomputer, FPGA, CPLD, PLD, ASIC, sea of gates, programmable device, discrete logic chips, discrete analog, digital or passive components, or any other implementation technique useable with OFDM application.

19. The method of claim 2 with the real and imaginary components of the signals within the active window are quantized to one of a limited number of quantization levels for processing in the predetermined plurality of calculation stages of the calculation block.

20. The method of claim 19 with the real and imaginary components of the signals which have a Gaussian or approximately Gaussian distribution, and the headroom, which is the ratio of the maximum quantization level to the root mean square (rms) value of the real component of the signal, being the ratio of the maximum quantization level to the standard deviation of the Gaussian signal, is selected to provide predetermined symbol distortion statistics.

21. The method of claim 20 where the headroom is between 8 and 30 dB relative to the mean power of the signal.

22. The method of claim 20 where the headroom tradeoff is between 9 and 25 dB relative to the mean power of the signal.

23. The method of claim 20 where the headroom tradeoff is between 10 and 20 dB relative to the mean power of the signal.

24. The method of claim 20 where the headroom tradeoff is between 10 and 15 dB relative to the mean power of the signal.

25. The method of claim 20 where the headroom tradeoff is between 10 and 13 dB relative to the mean power of the signal.

26. The method of claim 19 with the real and imaginary components of the signals having a Gaussian or approximately Gaussian distribution and the headroom, being the ratio of the maximum quantization level to the standard deviation of the Gaussian signal, is selected to provide predetermined symbol distortion statistics where symbol distortion is the sum of the mean square errors across all of the outputs from one transform operation.

27. An apparatus for receiving data in a multicarrier modulation system, comprising:
an input for receiving a signal;
an output for outputting a processed signal; and
a calculation block for processing the signal, the calculation block including a Fast Fourier Transform (FFT) structure and being programmed to allow a predetermined low probability of saturation of the signal, the FFT structure having two or more calculation stages and the predetermined low probability of saturation being provided by sealing of the signal at the calculation stages within the FFT structure, with the predetermined low probability of saturation being determined by providing a numerical calculation and scaling by the plurality of butterfly stages of the calculation block resulting with headroom being greater than headroom at the minimum mean square error due to quantization.

28. The apparatus of claim 27 having a plurality of stages in calculation block to provide a cumulative distribution of the real and imaginary components of the signals to have a Gaussian or approximately Gaussian distribution.

29. The apparatus of claim 28 with the scaling at each calculation stage is $1/\sqrt{2}$ in a radix 2 based transform.

30. The apparatus of claim 28 with the scaling at each calculation stage is alternately 1 and ½ at subsequent stages in a radix 2 based transform.

31. The apparatus of claim 28 with the scaling at each calculation stage is ½ of a radix 4 transform.

32. The apparatus of claim 27 with the calculation block configured to process the real and imaginary components of the signals within the active window and quantized to one of a limited number of quantization levels for processing in the predetermined plurality of calculation stages of the calculation block.

33. The apparatus of claim 32 with the calculation block configured to process the real and imaginary components of the signals having a Gaussian or approximately Gaussian distribution and the headroom, being the ratio of the maximum quantization level to the standard deviation of the Gaussian signal, is selected to provide predetermined symbol distortion statistics where symbol distortion is the sum of the mean square errors across all of the outputs from one transform operation.

34. The apparatus of claim 33 with the headroom is between 8 and 30 dB relative to the mean power of the signal.

35. The apparatus of claim 33 with the headroom tradeoff is between 9 and 25 dB relative to the mean power of the signal.

36. The apparatus of claim 33 with the headroom tradeoff is between 10 and 20 dB relative to the mean power of the signal.

37. The apparatus of claim 33 with the headroom tradeoff is between 10 and 15 dB relative to the mean power of the signal.

38. The apparatus of claim 33 with the headroom tradeoff is between 10 and 13 dB relative to the mean power of the signal.

39. The apparatus of claim 32 with the calculation block configured to process the real and imaginary components of the signals having a Gaussian or approximately Gaussian distribution with a predetermined headroom, being the ratio of the maximum quantization level to the standard deviation of the Gaussian signal, selected to provide predetermined symbol distortion statistics where symbol distortion is the sum of the mean square errors across all of the outputs from one transform operation.

40. The apparatus of claim 39 in which the calculation block is based on a Digital Signal Processor (DSP).

41. The apparatus of claim 39 in which the calculation block is based on any one or more of a processor, microprocessor, microcontroller, microcomputer, FPGA, CPLD, PLD, ASIC, sea of gates, programmable device, discrete logic chips, discrete analog, digital or passive components, or any other apparatus useable with OFDM application.

* * * * *

UNITED STATES PATENT AND TRADEMARK OFFICE
CERTIFICATE OF CORRECTION

| | |
|---|---|
| PATENT NO. | : 7,835,454 B2 |
| APPLICATION NO. | : 10/951319 |
| DATED | : November 16, 2010 |
| INVENTOR(S) | : Armstrong et al. |

It is certified that error appears in the above-identified patent and that said Letters Patent is hereby corrected as shown below:

Column 25

Claim 27, line 11, "sealing" should be --scaling--.

Signed and Sealed this
Twenty-second Day of February, 2011

David J. Kappos
*Director of the United States Patent and Trademark Office*